US009983860B1

(12) United States Patent
Koty et al.

(10) Patent No.: US 9,983,860 B1
(45) Date of Patent: May 29, 2018

(54) CONTINUOUS APPLICATION DELIVERY MONITORING

(71) Applicant: Equinix, Inc., Redwood City, CA (US)

(72) Inventors: Ramchandra Jayateerth Koty, Sunnyvale, CA (US); Kalidas Ganesan, Santa Clara, CA (US); Vijaay Doraiswamy, Fremont, CA (US); Jaganathan Jeyapaul, San Jose, CA (US); Balasubramaniyan Kannan, Sunnyvale, CA (US); Manikandan Vasu, Sunnyvale, CA (US); Ramnath Anantharaman, Sunnyvale, CA (US)

(73) Assignee: Equinix, Inc., Redwood City, CA (US)

( * ) Notice: Subject to any disclaimer, the term of this patent is extended or adjusted under 35 U.S.C. 154(b) by 123 days.

(21) Appl. No.: 15/064,059

(22) Filed: Mar. 8, 2016

Related U.S. Application Data

(60) Provisional application No. 62/291,886, filed on Feb. 5, 2016.

(51) Int. Cl.
*G06F 9/445* (2018.01)
*H04L 29/08* (2006.01)

(52) U.S. Cl.
CPC .............. *G06F 8/60* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2004/0139371 A1* | 7/2004 | Wilson | ................... | H04L 41/00 714/43 |
| 2005/0169315 A1* | 8/2005 | Jiang | ................... | H04L 12/2854 370/493 |
| 2007/0083588 A1* | 4/2007 | Keller | ................... | G06F 9/5038 709/202 |
| 2008/0165943 A1* | 7/2008 | Gonzalez Lopez | ..... | H04W 4/00 379/201.12 |

(Continued)

OTHER PUBLICATIONS

U.S. Appl. No. 15/099,407, by Juxiang Teng, filed Apr. 14, 2016.
(Continued)

*Primary Examiner* — Philip Wang
(74) *Attorney, Agent, or Firm* — Shumaker & Sieffert, P.A.

(57) ABSTRACT

In some examples, an application delivery monitor system includes an application programming interface gateway to execute an application programming interface to receive, from a user device, a request for continuous application delivery progress for an application; and an orchestrator to send, in response to the request, respective sub-requests for the request to a plurality of continuous application delivery sub-systems of an application delivery platform, wherein the orchestrator is further configured to receive, in response to the sub-requests, respective indications of continuous application delivery progress from the plurality of continuous application delivery sub-systems, and wherein the orchestrator is further configured to send, to the user device, a consolidated response to the request, wherein the consolidated response includes the respective indications of continuous application delivery progress from the plurality of continuous application delivery sub-systems.

22 Claims, 15 Drawing Sheets

(56) References Cited

U.S. PATENT DOCUMENTS

| | | | |
|---|---|---|---|
| 2014/0280961 A1* | 9/2014 | Martinez | H04L 41/5054 709/226 |
| 2016/0034380 A1* | 2/2016 | Shani | G06F 11/3636 717/172 |
| 2016/0127454 A1 | 5/2016 | Maheshwari et al. | |
| 2017/0003948 A1* | 1/2017 | Iyer | G06F 8/65 |

OTHER PUBLICATIONS

U.S. Appl. No. 15/001,766, by Ravindra JN Rao, filed Jan. 20, 2016.
Rosen et al., "BGP/MPLS IP Virtual Private Networks (VPNs)," RFC 4364, Network Working Group, Feb. 2016, 47 pp.

* cited by examiner

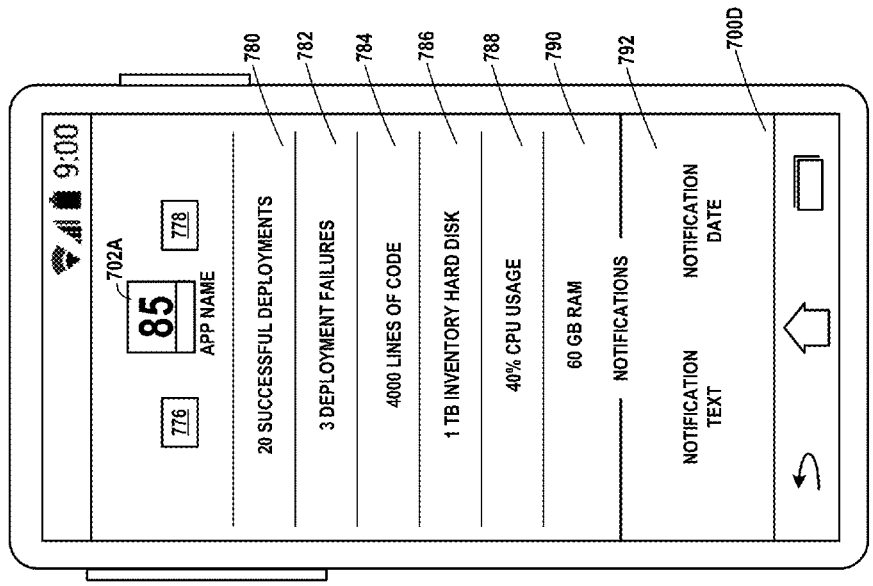
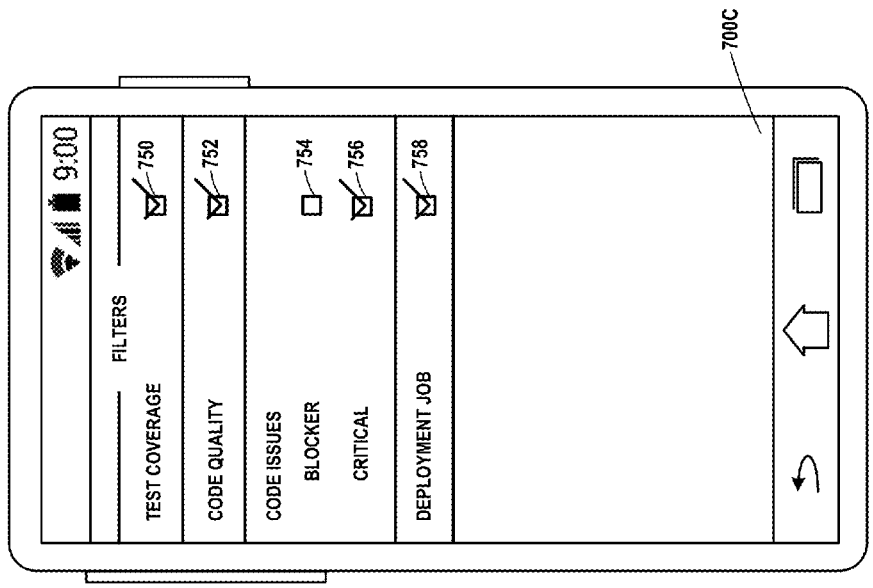
FIG. 11
FIG. 10

CONTINUOUS APPLICATION DELIVERY MONITORING

This application claims the benefit of U.S. Provisional Patent Application 62/291,886, filed Feb. 5, 2016, the entire content of which is incorporated herein by reference.

TECHNICAL FIELD

The invention relates to computer networks and, more specifically, to computer application development and delivery.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Cloud services have propelled a continuous application development model (also referred to as a continuous application deployment model or, more simply, continuous delivery) or CAD in which aspects of application development, building, testing, release automation, continuous integration, and lifecycle management are automated and continuously performed to accelerate reliable release of software and software upgrades.

SUMMARY

In general, this disclosure describes an extensible, consolidated application framework for continuous application delivery monitoring. In some examples, a microservices-based continuous application delivery (CAD) monitoring application exposes a composite application programming interface (API) by which a user device may request a consolidated response of indications of CAD progress for one or more applications monitored by the CAD monitoring application. The CAD monitoring application orchestrates, according to configurable rules-based workflows, parallelized execution of respective sub-requests to a plurality of CAD sub-systems to obtain respective indications of CAD progress in the respective sub-system domains and returns a consolidated response for presentation and output to display. In some instances, the CAD monitoring application may be programmatically extended to obtain indications from additional sub-systems and to incorporate the indications into the consolidated response.

In some examples, the CAD monitoring application generates, for a given application undergoing CAD, an application health index ("health index") indicating CAD progress for the application, based on the respective indications of CAD progress obtained from the plurality of CAD sub-systems. The health index may be an integer or percentage, for instance, and provides an indication of or snapshot into the overall progress of the application in the enterprise. For instance, the CAD monitoring application may apply a model to the indications obtained for the various CAD stages for an application to generate the health index for the application. The CAD monitoring application may send the health index to the user device as part of a consolidated response to a composite API request.

The techniques may provide one or more advantages. For example, a user device invoking the composite API of the CAD monitoring application may obtain, on a "single pane of glass" in some cases, visibility into the various continuous application delivery stages, such as code management, integration, deployment management, container management, application metrics, and so forth. In other words, the single pane of glass abstracts the plurality of CAD sub-systems in the continuous integration ecosystem to provide consolidated indications of CAD progress for applications. Further, a CAD monitoring application developer may in some instances readily extend the composite API by managing the microservices-based workflow, sub-system API endpoint configuration, and API rules to incorporate additional CAD sub-systems. In addition, health indices for multiple applications may in some cases provide, at a glance, enterprise-wide visibility into the CAD progress of an enterprise application suite.

In some examples, a method comprises receiving, by a computing device from a user device, a request for continuous application delivery progress for an application; sending, by the computing device in response to the request, respective sub-requests for the request to a plurality of continuous application delivery sub-systems of an application delivery platform; receiving, by the computing device in response to the sub-requests, respective indications of continuous application delivery progress from the plurality of continuous application delivery sub-systems; and sending, by the computing device to the user device, a consolidated response to the request, wherein the consolidated response includes the respective indications of continuous application delivery progress from the plurality of continuous application delivery sub-systems.

In some examples, an application delivery monitor system comprises one or more programmable processors operably coupled to at least one memory; an application programming interface gateway configured for execution by the one or more programmable processors to execute an application programming interface to receive, from a user device, a request for continuous application delivery progress for an application; and an orchestrator configured for execution by one or more programmable processors to send, in response to the request, respective sub-requests for the request to a plurality of continuous application delivery sub-systems of an application delivery platform, wherein the orchestrator is further configured to receive, in response to the sub-requests, respective indications of continuous application delivery progress from the plurality of continuous application delivery sub-systems, and wherein the orchestrator is further configured to send, to the user device, a consolidated response to the request, wherein the consolidated response includes the respective indications of continuous application delivery progress from the plurality of continuous application delivery sub-systems.

In some examples, a computing device comprises one or more programmable processors operably coupled to at least one memory; a user application configured for execution by the one or more programmable processors to receive, from an application delivery monitor, a consolidated response comprising a plurality of indications of continuous application delivery progress for an application, the plurality of indications generated by respective continuous application delivery sub-systems of an application delivery platform, wherein the user application is further configured to output, to a display device, the plurality of indications.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 8-11 are block diagrams illustrating example user devices configured to display various screens of user application for presenting, to a display device for a user device, indications of CAD progress for applications and for configuring the presentation, in accordance with techniques described in this disclosure.

Like reference characters denote like elements throughout the figures and text.

DETAILED DESCRIPTION

Figure 1:
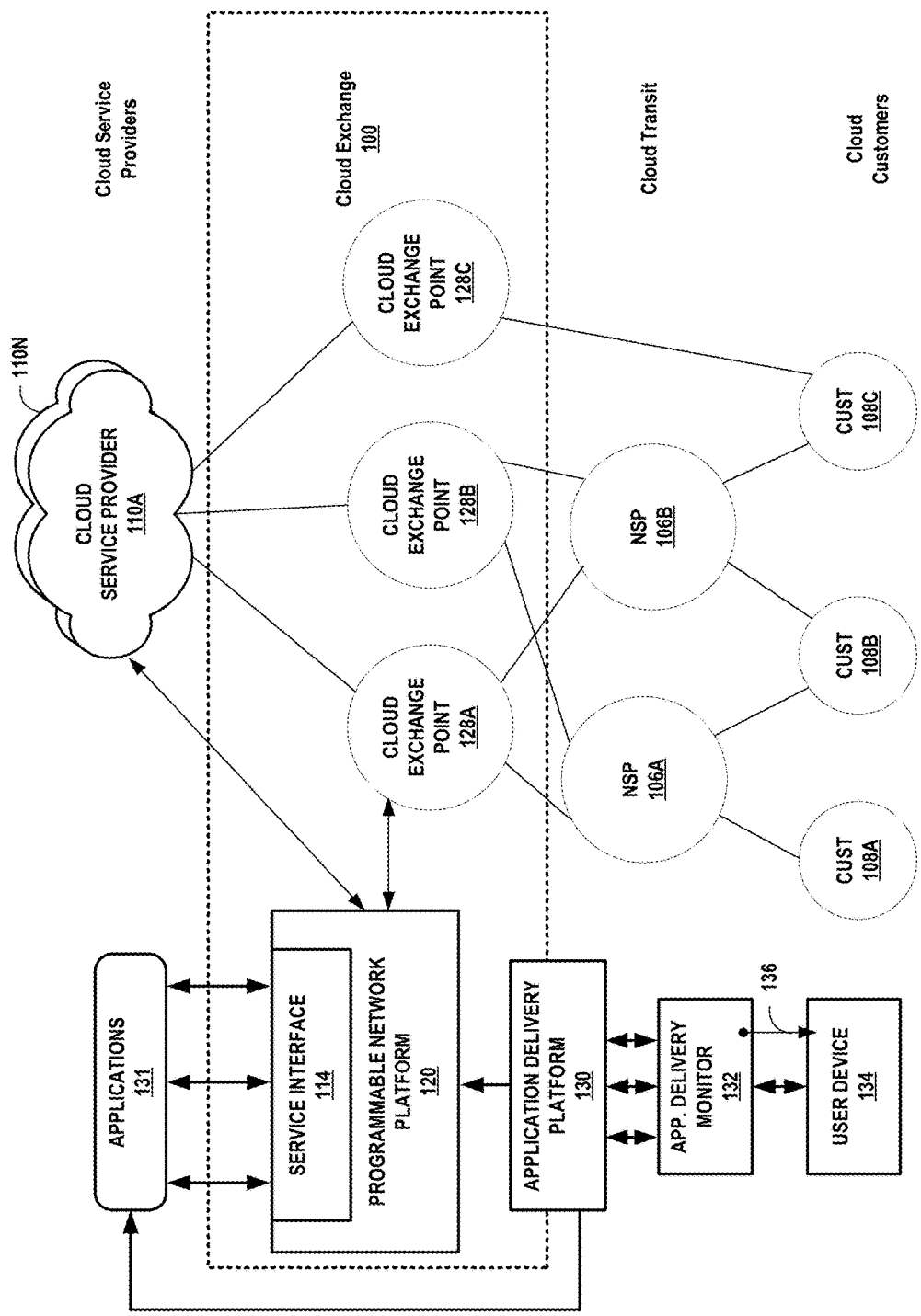
FIG. 1 illustrates a conceptual view of a network system having a metro-based cloud exchange that provides multiple cloud exchange points and is operated at least in part by a programmable network platform deployed using continuous application delivery monitoring, according to techniques described herein.

FIG. 1 illustrates a conceptual view of a network system having a metro-based cloud exchange that provides multiple cloud exchange points and is operated at least in part by a programmable network platform deployed using continuous application delivery monitoring, according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Washington; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would otherwise maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108D receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-as-a-Service (PaaS), Infrastructure-as-a-Service (IaaS), Virtualization-as-a-Service (VaaS), and data Storage-as-a-Service (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 131 may invoke the programmable network platform 120. The service interface 114 may allow carriers 106, customers 108, cloud service providers 110, and/or the cloud exchange provider programmable access to capabilities and assets of the cloud exchange 100. Applications 131 may include a customer portal, one or more enterprise-developed applications, and one or more cloud exchange provider-developed applications. Applications 131 may in some cases represent a marketing application, a finance application, or other application for operating and marketing a cloud exchange or other interconnection facility.

For example and as further described herein, the service interface 114 may facilitate machine-to-machine communication to enable dynamic provisioning of virtual circuits in the cloud exchange for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the cloud exchange.

Further example details of a cloud-based services exchange can be found in U.S. Provisional Patent Application 62/149,374, filed Apr. 17, 2015 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" each of which are incorporated herein by reference in their respective entireties. Further example details of a programmable network platform are found in U.S. patent application Ser. No. 15/001,766, filed Jan. 20, 2016, which is incorporated herein by reference in its entirety.

An application developer deploys applications using an application delivery platform 130 that includes a plurality of continuous application development (CAD) sub-systems that execute to automate aspects of code management, continuous integration, application deployment management, container management, application build, and infrastructure management. For example, the cloud exchange provider for cloud exchange 100 may develop and deploy any of applications 131 and programmable platform 120 using the techniques described herein, in order to deploy applications for automated configuration, operation, and administration of the cloud exchange 100.

In accordance with techniques of this disclosure, application delivery monitor 132 represents an extensible, consolidated application framework for continuous application delivery monitoring. Application delivery monitor 132 may include one or more applications executing at one or more computing devices in a public cloud operated by a cloud service provider, at a private cloud or one or more workstations or server devices operated by the application developer, or at one or more other computing devices.

A user device 132 may request, from application delivery monitor 132, a consolidated response of indications of CAD progress for one or more applications monitored by the application delivery monitor 132 via the application delivery platform 130. User device 132 may represent a desktop or laptop computer, tablet, smartphone, PDA, or other computing device.

The application delivery monitor 132, in response to receiving a request from user device 132, orchestrates execution of respective sub-requests to the application delivery platform 130 to obtain respective indications of CAD progress in the respective CAD sub-system domains. Application delivery monitor 132 then generates and returns a consolidated response 136 for presentation and output to display at the user device 132. Consolidated response 136 for an application may include indications of, e.g., a number of successful/failed deployments, a size of the code base, a change in the size of the code base, application alerts, an application health index, infrastructure usage, feedback from various teams (development, CAD, and executive, for instance), resource (e.g., CPU) utilization, main memory and disk usage, and application versioning. Continuous application delivery progress for "an application" may refer herein to progress for a particular version of the application.

As a result, a user device 134 may obtain, on a single pane of glass (e.g., at display provided by a single application executed by a single device), visibility into the various CAD stages/sub-systems, such as code management, continuous integration, deployment management, container management, and application metrics, for one or more applications monitored by application delivery monitor 132.

Figure 2:
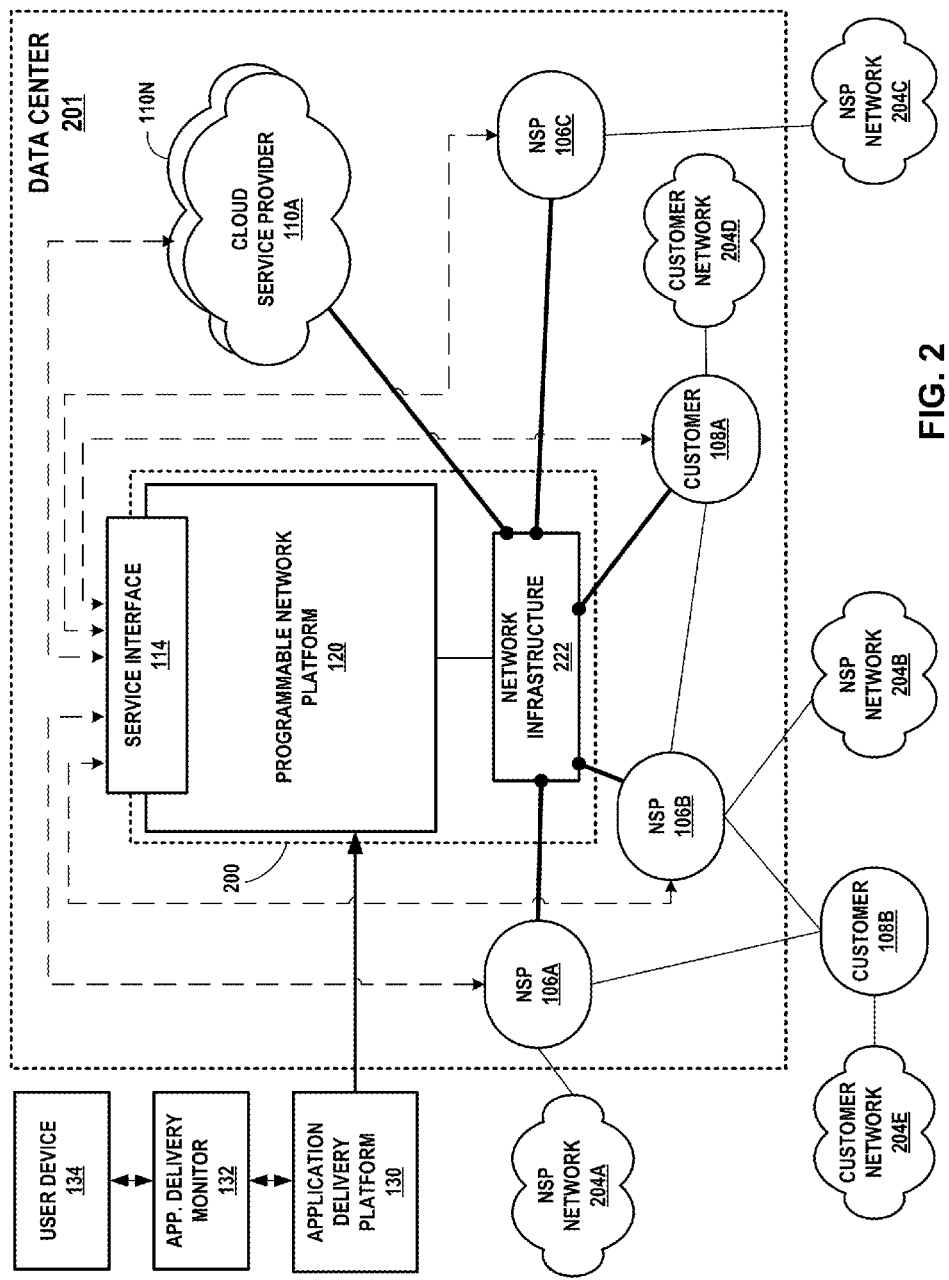
FIG. 2 is a block diagram illustrating a high-level view of a data center that provides an operating environment for a cloud-based services exchange configurable in part by a programmable network platform, the deployment of which is monitored according to techniques described herein.

FIG. 2 is a block diagram illustrating a high-level view of a data center 201 that provides an operating environment for a cloud-based services exchange 200 configurable in part by a programmable network platform, the deployment of which is monitored according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly cross-connected, via a layer 3 (L3) or layer 2 (L2) connection to any other customer network and/or to any of cloud service providers 110A-110N, thereby allowing exchange of cloud service traffic among the customer networks and CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility. Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By being connected to and utilizing cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interfaces, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider (seller) side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

As further described herein, the service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

Application delivery platform 130, application delivery monitor 132, and user device 134 may operate in a manner similar to that described in FIG. 1 to deploy and monitor the deployment of programmable network platform 120 for configuring cloud exchange 200.

Figure 3A:
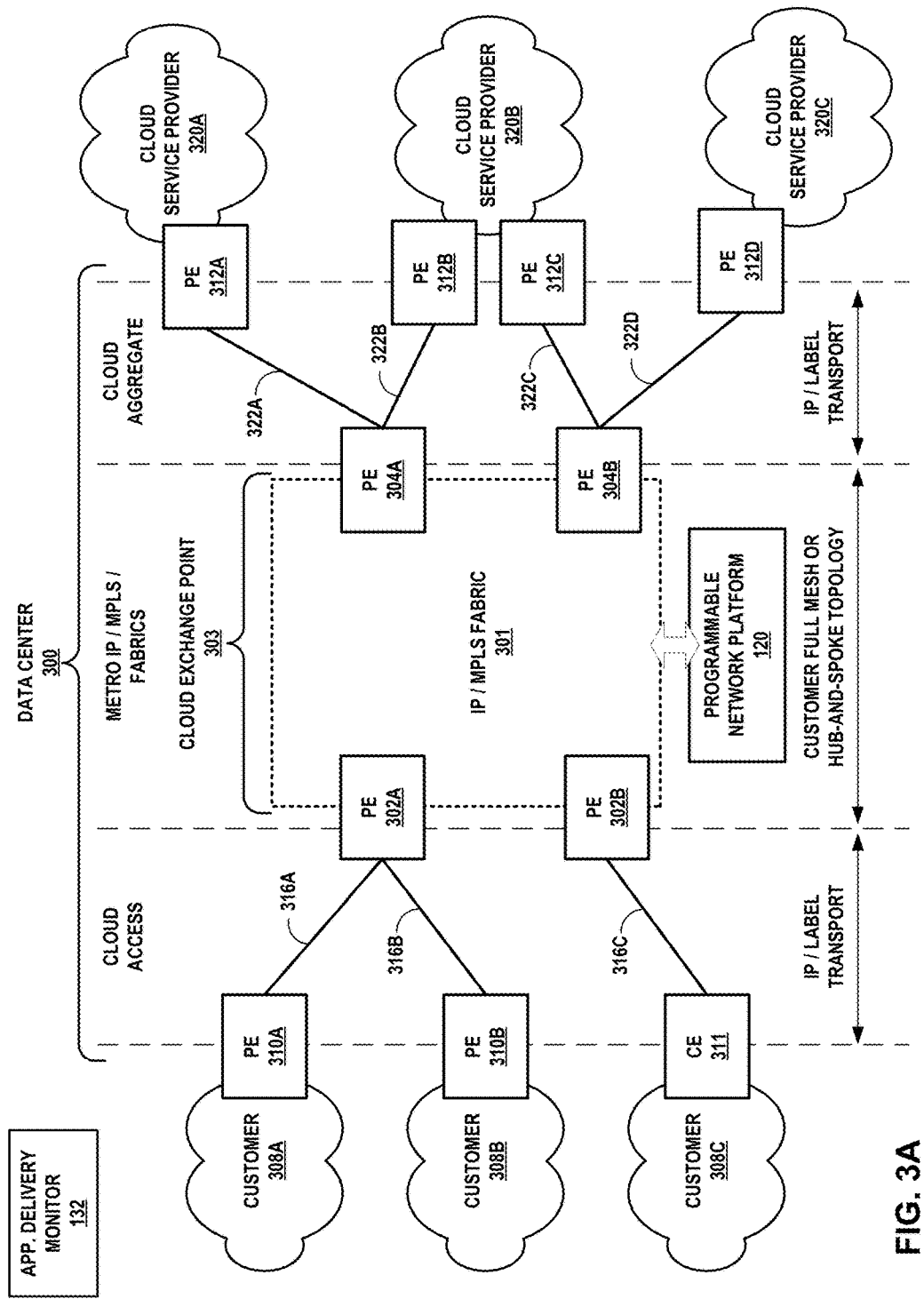
FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, where the programmable network platform deployment is monitored according to techniques described herein.
Figure 3B:
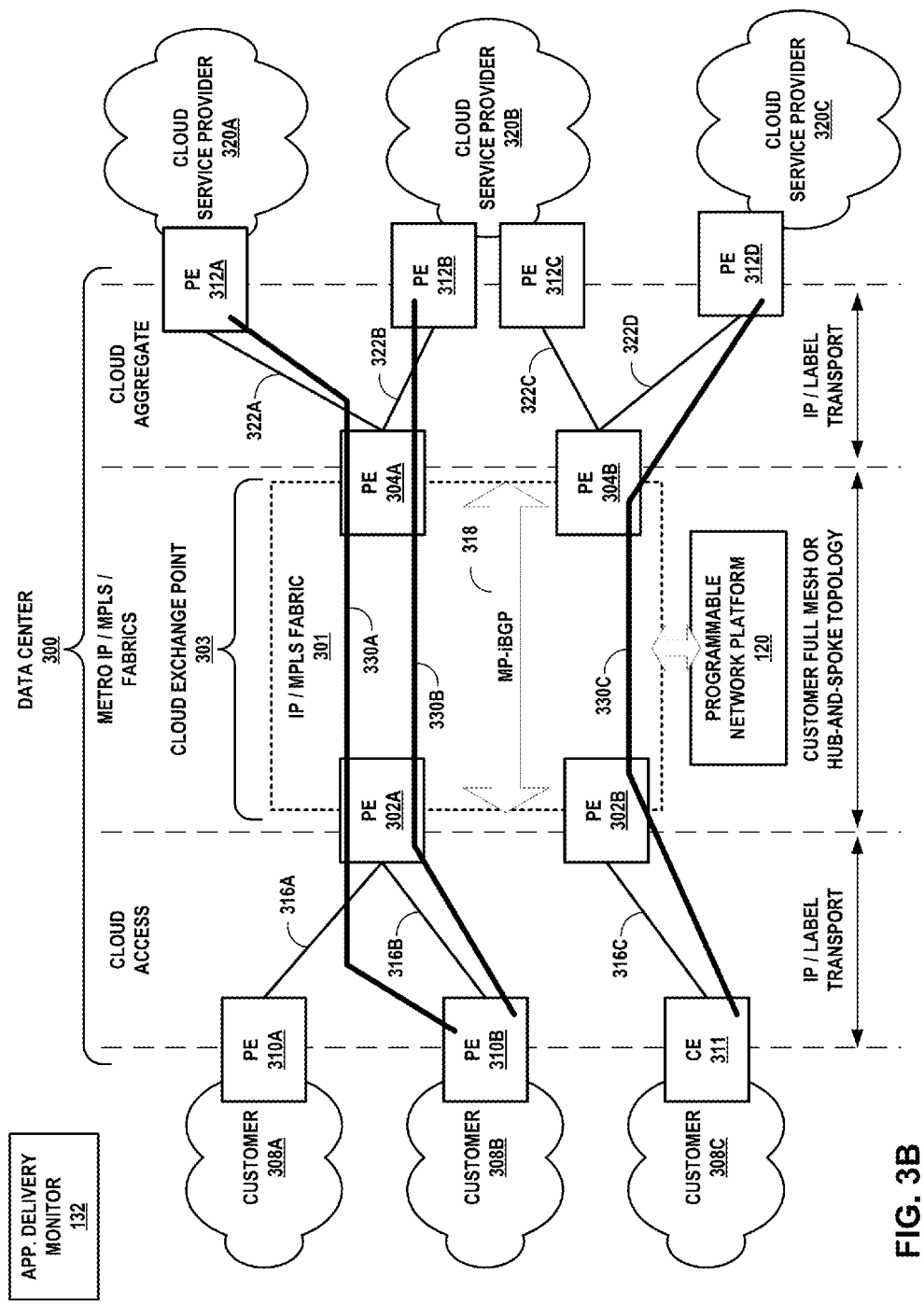

FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, where the programmable network platform deployment is monitored according to techniques described herein. In this example, customer networks 308A-308C (collectively, "customer networks 308"), each associated with a different customer, access a cloud exchange point within a data center 300 in order to receive aggregated cloud services from one or more cloud service provider networks 320, each associated with a different cloud service provider 110. Customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with a L3 virtual routing and forwarding instances (VRFs), as described in further detail below with respect to FIG. 4.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead cross-connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and cross-connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303. Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN. Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 cross-connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Application delivery platform 130 (not shown in FIGS. 3A-3B), application delivery monitor 132, and user device 134 (not shown in FIGS. 3A-3B) may operate in a manner similar to that described in FIG. 1 to deploy and monitor the deployment of programmable network platform 120 for configuring cloud exchange point 303.

Figure 4:
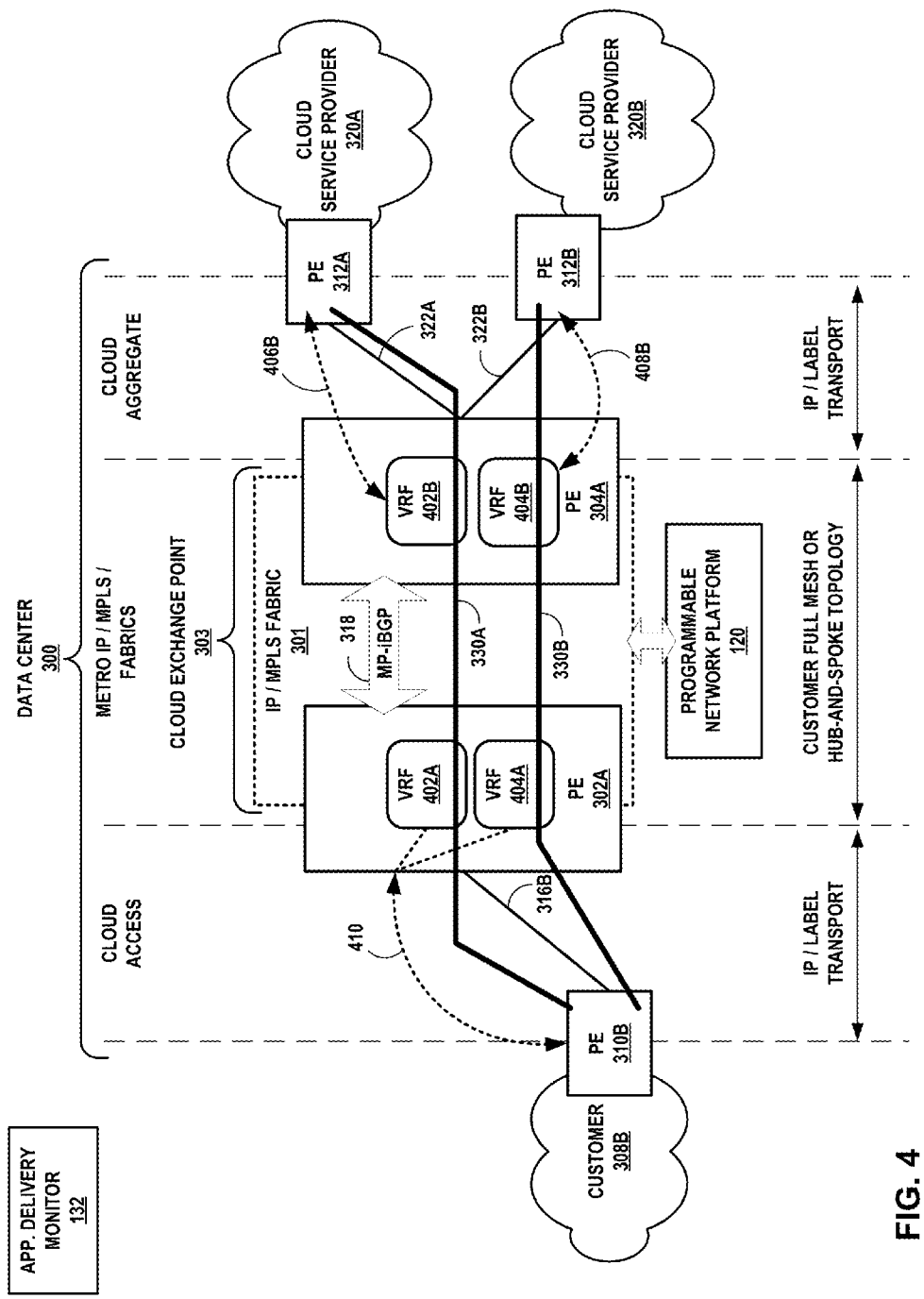
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, the programmable network platform being deployed and monitored according to techniques described herein.

FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, the programmable network platform being deployed and monitored according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer is able to access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table in order to reach cloud service provider networks 320 or customer networks 308. Moreover, PEs 302A, 304A may be configured to aggregate customer/CSP routes and/or service traffic based on any one or more of physical, IP, service, and VRFs.

Application delivery platform 130 (not shown in FIG. 4), application delivery monitor 132, and user device 134 (not shown in FIG. 4) may operate in a manner similar to that described in FIG. 1 to deploy and monitor the deployment of programmable network platform 120 for configuring cloud exchange point 303.

Figure 5:
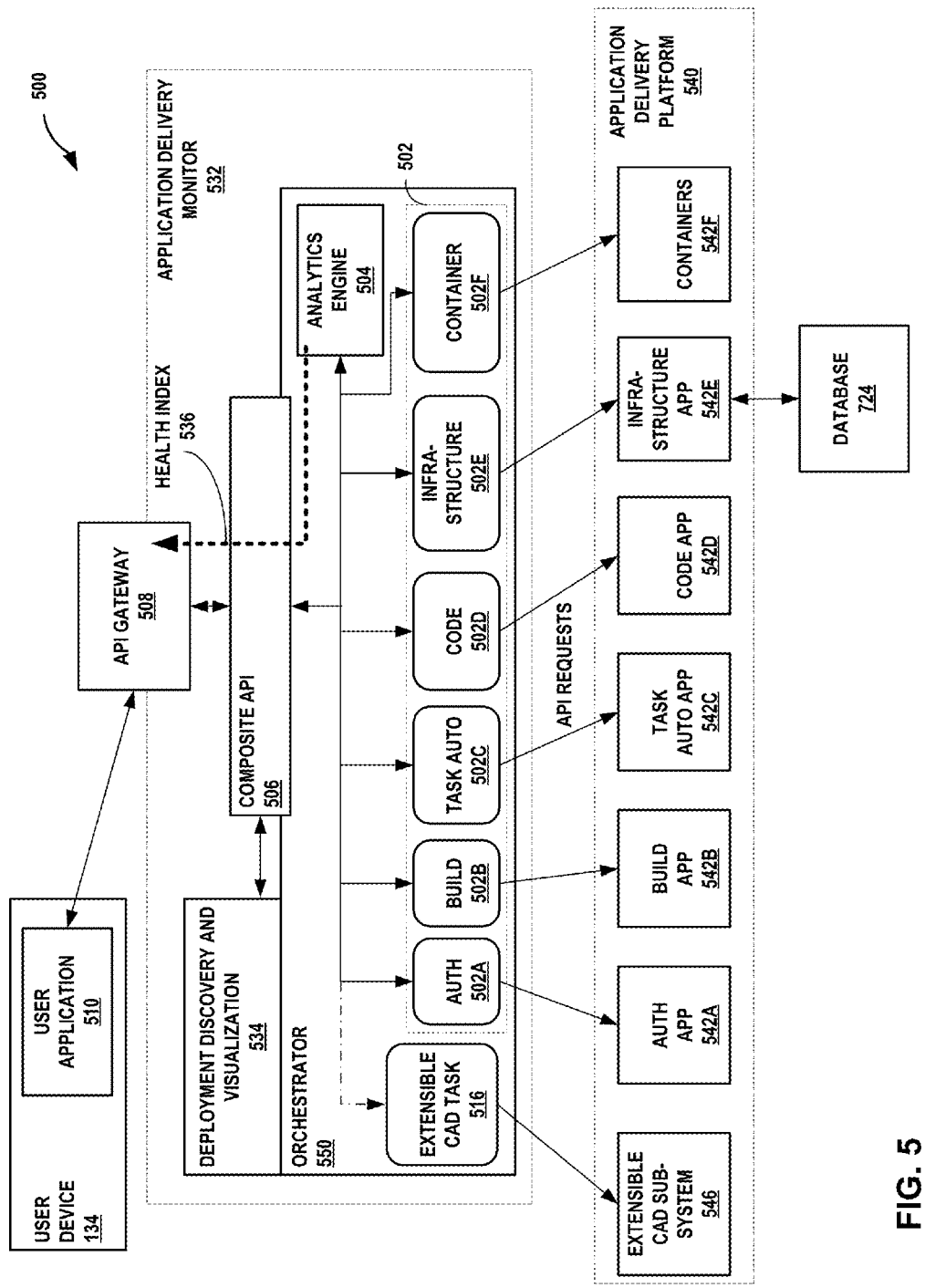
FIG. 5 is a block diagram illustrating an example system for continuous application deployment and monitoring, according to techniques described in this disclosure.

FIG. 5 is a block diagram illustrating an example system 500 for continuous application deployment and monitoring, according to techniques described in this disclosure. Application delivery monitor 532 and application delivery platform 540 may represent example instances of application delivery monitor 132 and 130 of FIG. 1, respectively. Application delivery platform 540 includes a plurality of CAD sub-systems, including CAD sub-systems 542A-542F (collectively, "CAD sub-systems 542") and extensible CAD sub-system 546. Each of the CAD sub-systems 542, 546 may represent one or more applications that execute on-premises or at a cloud service to perform a continuous application delivery function. Each of the CAD sub-systems 542, 546 includes a corresponding application programming interface (API) by which a user may receive authorization to access the application delivery monitor 132 or by which application delivery monitor 532 may obtain data indicating a CAD progress of an application, in response to a request made via composite API 506 (described in further detail below).

In the illustrated example, authentication application 542A performs login authentication for users of user device 134 seeking authentication and authorization to access services provided by application delivery monitor 532. Authentication application ("AUTH APP") 542A may provide OAuth-based authentication. Authentication application 542A may represent JIRA, in some examples. Build application 542B represents a platform for automated build, packaging, staging, and deployment of an application. For example, build application 542B may include at least one application triggered to build an application on a code repository check-in. Build application 542B represents Jenkins, in some instances. Task automation application 542C represents a platform for defining and executing a single step or workflow to execute commands, scripts, routines, applications, tools, or other executables to perform task automation for CAD for an application. Task automation application 542C represents RunDeck, in some instances. Code application 542D represents at least one platform for code repository hosting, revision control, and/or source code management for an application. Code application 542D may include GitHub, in some instances. Code application 542D may alternatively or additional include SonarQube, in some instances. Infrastructure application 542E represents a database management system for database 724. Database 724 may represent a Structured Query Language (SQL)-based, NoSQL-based, relational, or other type of database. Infrastructure application 542E may represent a corresponding database management system or server, such as MongoDB, Oracle Server, or SQL Server. Containers application 542F represents a platform for container management. Like a virtual machine, a container is virtualized and may remain isolated from the host machine and other containers on which it executes. However, unlike a virtual machine, each container may omit an individual operating system and provide only an application suite and application-specific libraries. Each container is executed by the host machine as an isolated user-space instance and may share an operating system and common libraries with other containers executing on the host machine. Thus, a cloud network using containers may require much less processing power, storage, and network resources than a cloud network implementing virtual machines. As used herein, "containers" may also be referred to as virtualization engines, virtual private servers, silos, or jails. Containers application 542F may represent the Docker Container application, in some instances.

Application delivery monitor 532 includes an orchestrator platform 550 ("orchestrator 550"), which includes one or more applications for invoking CAD sub-system tasks 502 and extensible CAD task 516. Tasks 502, 516 may represent separate applications, microservices, or routines, and invoke respective interfaces for CAD sub-systems 542, 546 to obtain from the corresponding CAD sub-system at least one indication of CAD progress for an application. Orchestrator 550 executes a composite application programming interface (API) to receive requests, directed from API gateway 508, for indications of CAD progress for an application and other requests directed from API gateway 508 (e.g., a login request).

For example, user application 510 (e.g. a web browser) may receive a login page accessible via API gateway 508 and pass login information, such as one or more of a user name, password, API key, and API secret, to API gateway 508. API gateway 508 may invoke authorization application task 502A to perform API key and API secret validation and, for example, provide an OAuth 2.0 token back to the user application 510 for future invocations of composite API 506. That is, user application 510 may invoke a composite API endpoint by providing the OAuth 2.0 token and one or more parameters to API gateway 506. API gateway 506 may perform a data format transformation (e.g., XML, JSON) and OAuth 2.0 token validation. API gateway 506 then contacts orchestrator 550 to invoke the service identified by the composite API endpoint.

Orchestrator 550 receives requests via composite API 506 and performs the requested service to provide indications of CAD progress for an application. More specifically, orchestrator 550 executes a plurality of the requisite tasks 502, 516 to obtain respective indications from multiple CAD sub-systems 542, 546, consolidate the indications, and provide the indications to user application 510 in a composite response to fulfill the service contract for the endpoint of composite API 506. In some cases, orchestrator 550 may execute multiple tasks 502, 516 in parallel.

In the example of FIG. 5, application delivery monitor 532 includes analytics engine 504. Analytics engine 504 determines, based on the multiple indications received from respective CAD sub-systems 542, 546, an application health index 536 ("health index 536") indicating CAD progress for an application, based on the respective indications of CAD progress obtained from the plurality of CAD sub-systems for the application. The health index 536 may be an integer or percentage, for instance, and provides a snapshot into the overall CAD progress of the application. For instance, analytics engine 504 may apply a model to the indications obtained for the various CAD stages for an application to generate the health index 536 for the application. The application delivery monitor 532 may send the health index 536 to the user device 134 as part of a consolidated response to a composite API request made to composite API 506.

In some examples, user application 510 may trigger one or more actions based on the health index 536 received for an application. For example, in response to receiving a health index indicating a high level of health of an application, user application 510 may display a screen to allow the user to input a new release date for the application. The user responsively enters the data for specifying a release date and any other required details via a user interface of user device 134 (not shown), and user application 510 may in response send the action on to, for instance, an operator or execute team member for approval. As another example of a triggered action, user application 510 may be configured to, in response to receiving a certain level of health indication, display a screen depicting a list of jobs for the application. The user may, via the user interface, select a job from the list, and in response to receiving an indication of the selected job the user application 510 may direct the application delivery monitor 532 to run the selected job. The application delivery monitor 532, in response, may direct the appropriate task automation CAD sub-system 542C to run the job via the appropriate API. As another example, user application 510 may display, via the user interface of user device 134, one or more alerts based on the health index 536.

Orchestrator 550 and API gateway 508 may execute on management devices such as one or virtual machines and/or real servers. Although shown as single elements in FIG. 5, each of orchestrator 550 and API gateway 508 may execute on a cluster of one or more physical and/or virtual computing machines executing on one or more physical processors.

Composite API 506 may represent a RESTful interface with multiple endpoints. Composite API 506 may receive HTTP requests and return HTTP responses that include a JavaScript Object Notation (JSON) response that can be presented by user application 510 executing, e.g., a web browser or smartphone application. Responses to composite API 506 requests include multiple indications of CAD progress obtained by application delivery monitor 532 from multiple different CAD subsystems 542, 546.

The following are example API endpoints and JSON-formatted example responses for the example API endpoints.

Login API

TABLE 1

| Login API | |
|---|---|
| METHOD | POST |
| API | cad/login |
| URL | http://domain.com/cad/login |
| HEADER | Content-Type: application/json apikey: |
| DESCRIPTION | Creates a new session for a user in the system. |
| VERSION | 1.0 |

Sample Request
{
  "username": "cadapi",
  "password": "#Welcome123 8"
}
Sample Request URL
POST http://<HOST>:<PORT>/cad/jira/login
Sample Response for Successful Login
{
  "session":
  "name": "JSESSIONID",
  "value": "0235F3B66E0CF01A614AAAE029097EDF"
  "OAuthToken": [token-value]
},
"loginInfo": {
"failedLoginCount": 1,
"loginCount": 52,
"lastFailedLoginTime": "2015-08-27T04:00:12.926-0700",
"previousLoginTime": "2015-10-29T12:17:36.632-0700"
}
}
Sample Response for Unsuccessful Login
HTTP 400 BAD REQUEST
Content-Type: APPLICATION/JSON
{
  "errorMessages": [
  "Login failed"
  ],
  "errors": { }
}
Logout API

TABLE 2

| Logout API | |
|---|---|
| METHOD | POST |
| API | cad/login |
| URL | http://domain.com/cad/logout |
| HEADER | Content-Type: application/json apikey: |
| DESCRIPTION | Logs the current user out of the system, destroying the existing session, if any. |
| VERSION | 1.0 |

To call the Logout API, the JSESSIONID from the Login api response and its value should be passed in the Cookie header.
Sample Request:
DELETE: http://<HOST>:<PORT>/cad/logout
Headers: {Cookie: JSESSIONID=value}
Sample Response:
204: Returned if the user was successfully logged out.
401: Returned if the caller is not authenticated.
List All Projects API

TABLE 3

| List All Projects API | |
|---|---|
| METHOD | Get |
| API | cad/v1/api/apps |
| URL | http://domain.com/cad/v1/api/apps |
| HEADER | Content-Type: application/json apikey: |
| DESCRIPTION | Gets the list of applications |
| VERSION | 1.0 |

Sample Response
{
  "appdetails": {
  "apps": [
  {
  "_id": "564a39d7e90a991c3b1c4c2c",
  "appname": "MKP",
  "appversion": "1.0",
  "applead": "ABC",
  "apptitle": "testapp",
  "apphealth": 70,
  "notificationcount": 25, -continued

```
    "hardware": {
       "totalram": 40,
       "totalcpu": 30,
       "total storage": 4,
       "totalmachines": 10
    },
    "jobs": {
       "jobsrun": 0
    },
    "appalias": [
       "MKP",
       "MKP-Alias 1",
       "MKP-Alias 2"
    ],
    "coverage": {
       "linesofcode": 572615,
       "blockerissues": 9,
       "criticalissues": 35
    },
    "builds": {
       "successful": "20",
       "failed": "10"
    },
    "appbadge": [
       "LEAN",
       "TAB"
    ]
}, {
    "_id": "564a39d7e90a991c3b1c4c2d",
    "appname": "Portal",
    "appversion": "1.0",
    "applead": "ABC",
    "apptitle": "Central Portal",
    "apphealth": 65,
    "notificationcount": 25,
    "hardware": {
       "totalram": 40,
       "totalcpu": 30,
       "total storage": 4,
       "totalmachines": 10
    },
    "jobs": {
       "jobsrun": 0
    },
    "appalias": [
       "PCP"
    ],
    "coverage": {
       "linesofcode": 500,
       "blockerissues": 88,
       "criticalissues": 4
    },
    "builds": {
       "successful": "20",
       "failed": "10"
    },
    "appbadge": [
       "LEAN",
       "TAB"
    ]
  }
 ]
 }
}
```

List App by AppKey

TABLE 4

| List App by AppKey API | |
|---|---|
| METHOD | Get |
| API | cad/v1/api/app/:appkey |
| URL | http://domain.com/cad/v1/api/app/:appkey |
| HEADER | Content-Type: application/json<br>apikey: |

TABLE 4-continued

| List App by AppKey API | |
|---|---|
| METHOD | Get |
| DESCRIPTION | Gets the complete application information for the supplied app key |
| VERSION | 1.0 |

Request Parameter

TABLE 5

| List App by AppKey API Request Parms | | |
|---|---|---|
| Parameter | Type | Description |
| appkey | String | Name of the app for which details is to be retrieved. |

Sample Response
```
{
   "appdetails": {
      "app": {
         "_id": "564a39d7e90a991c3b1c4c2a",
         "appname": "ECX",
         "appversion": "1.0",
         "applead": "ABC",
         "apptitle": "myappmkp",
         "apphealth": 90,
         "colorcode": "green",
         "notificationcount": 25,
         "builds":
            "successful": 20,
            "failed": 10
         },
         "hardware": {
            "totalram": 40,
            "totalcpu": 30,
            "total storage": 4,
            "totalmachines": 10
         },
         "jobs": {
            "jobsrun": 6
         },
         "appalias": [
            "ECX",
            "ECX-Alias 1",
            "ECX-Alias 2"
         ],
         "coverage": {
            "linesofcode": 183953,
            "blockerissues": 88,
            "criticalissues": 4
         }
      }
   }
}
```

In some examples, Consolidated API 506 may be invoked to restricting user access to run jobs via the task automation application 542C. The user of user device 134 logs in to composite API 506 to obtain a user profile. Retrieve ONLY RUNDECK PROD groups from GET user profile api—sample response:
```
"Groups": [
   {
      "self":"http://domain.com/rest/api/2/
         group?groupname=ACL-RUNDECK-ADMIN",
      "name": "ACL-RUNDECK-ADMIN"
   },
```

```
{
"self":"http://domain.com/rest/api/2/
    group?groupname=ACL-RUNDECK-MKP-PROD-
    JOB-EXEC",
"name": "ACL-RUNDECK-MKP-PROD-JOB-EXEC"
}
]
```
Retrieve App key from "name": "ACL-RUNDECK-MKP-PROD-JOB-EXEC"
    For example: ACL-RUNDECK-MKP-PROD-JOB-EXEC
    MKP---->Appkey
    PROD---->environment
    Validate Appkey when calling/app/:appkey. If the validation is successful, then allow the user to run jobs. Otherwise disable the "Run" button presented at user application 510.
    List Rundeck Jobs API

TABLE 6

List Rundeck Jobs API

| | |
|---|---|
| METHOD | Get |
| API | cad/v1/:PROJECTNAME/jobs |
| URL | http://domain.com/ cad/v1/DemoProject/jobs |
| HEADER | Content-Type: application/json<br>apikey:<br>X-Rundeck-Auth-Token: |
| DESCRIPTION | Provides a list of jobs available for the particular project |
| VERSION | 1.0 |

The user application 532 may be configured with a list of project keys that define the PROJECTNAME. For example: {"MKP": "Marketplace", "ECX": "Cloud exchange programmable network platform"}.
Request Parameter

TABLE 7

List Rundeck Jobs API Request Parms

| Parameter | Type | Description |
|---|---|---|
| PROJECTNAME | String | Name of the project for which the jobs need to be listed. |

Sample Request:
GET /cad/v1/DemoProject/jobs
Sample Response:
```
{
  "jobs": {
    "count": 4,
    "job": [
      {
        "id": "c7a8c046-d7a1-4f03-b33b-17e120abc38f",
        "name": "Test",
        "group": "UAT",
        "project": "DemoProject",
        "description": "Test Job in UATT"
      },
      {
        "id": "0a17953e-a4df-4057-9612-3f807768af43",
        "name": "Test Job DEV-INT",
        "group": "DEV-INT",
        "project": "DemoProject",
        "description": { }
      },
      {
        "id": "2e9f09fb-6318-4bb4-849b-7dd52911dcea",
        "name": "Test Job for QA",
        "group": "QA",
        "project": "DemoProject",
        "description": { }
      },
      {
        "id": "15083551-ab2d-4569-bd1a-6dca6f7fa0d1",
        "name": "Test Job for UAT",
        "group": "QA",
        "project": "DemoProject",
        "description": "Test Job for UAT"
      }
    ]
  }
}
```
Note: 'group' field in the response is the environment where the job will be run
    Run Jobs API

TABLE 8

Run Jobs API

| | |
|---|---|
| METHOD | Get |
| API | cad/v1/:jobid/executions |
| URL | http://domain.com/cad/v1/job/ 5bfe42e7-7907-4036-be1c-f039ab347eb4/executions |
| HEADER | Content-Type: application/json<br>apikey:<br>X-Rundeck-Auth-Token: |
| DESCRIPTION | Run a job using the job ID |
| VERSION | 1.0 |

Request Parameter

TABLE 9

Run Jobs API Request Parms

| Parameter | Type | Description |
|---|---|---|
| :jobid | String | ID of the job to be run |

Sample Request
GET http://domain.com/cad/v1/job/5bfe42e7-7907-4036-be1c-f039ab347eb4/executions
Sample Response
```
{
  "executions": {
    "count": 1,
    "execution": {
      "id": 1144361,
      "href": "http://jobscheduler.domain.com/execution/follow/1144361",
      "status": "running",
      "project": "DemoProject",
      "user": "userID",
      "date-started": {
        "unixtime": 1449025983299,
        "content": "2015-12-02T03:13:03Z"
      },
      "job": {
        "id": "5bfe42e7-7907-4036-be1c-f039ab347eb4",
        "averageDuration": 9446,
        "name": "DemoJob",
        "group": { },
```

```
    "project": "DemoProject",
    "description": "For Test Trigger"
  },
  "description": "echo\"Test for App\"",
  "argstring": { }
    }
   }
  }
}
```

Composite API 506 may in some examples provide an endpoint for obtaining a release schedule for an application. This screen should only be accessed by specific users. In the user profile api: get the TEAM [ ]. Only users who are part of an Allowed team can access this screen. TEAM:["Allowed"] is allowed to access schedule screen. For all other users, the "Schedule" screen should be disabled for user application 510.

Get Schedule API

TABLE 10

| Run Jobs API | |
|---|---|
| METHOD | Get |
| API URL | cad/v1/api/schedule/:appkey http://domain.com/cad/v1/api/schedule/:appkey |
| HEADER | Content-Type: application/json apikey: |
| DESCRIPTION | Gets the app release schedule for the specified app key |
| VERSION | 1.0 |

Request Parameter

TABLE 11

| Run Jobs API Request Parms | | |
|---|---|---|
| Parameter | Type | Description |
| app key | String | Name of the app for which schedule is retrieved. |

Sample Response
```
{
  "_id": "565558570db 19bb2398a6012",
  "appname": "ECX",
  "releasedetails": {
  "upcomingreleasedetails": [
    {
      "_id": "56555918102553e70ef243d1",
      "releasename": "ECX 1.2",
      "version": 12,
      "startdate": "2000-10-29T00:00:00.000Z",
      "releasedate": "2000-11-30T00:00:00.000Z",
      "golivedays": 10,
      "status": "InProgress",
      "statuscolor": "red"
    },
    {
      "_id": "56555918102553e70ef243d0",
      "releasename": "ECX 1.1",
      "version": 2.0,
      "startdate": "2000-10-09T00:00:00.000Z",
      "releasedate": "2000-11-30T00:00:00.000Z",
      "golivedays": 10,
      "status": "InProgress",
      "statuscolor": "green"
    }
  ],
  "currentreleasedetails": {
    "releasename": "ECX 1.0",
    "currentversion": 1.0,
    "startdate": "2000-10-09T00:00:00.000Z",
    "releasedate": "2000-11-30T00:00:00.000Z",
    "golivedays": 10,
    "status": "InProgress",
    "statuscolor": "orange"
  }
  }
}
```

Add Application Release Schedule API

TABLE 12

| Add Application Release Schedule API | |
|---|---|
| METHOD | POST |
| API URL | cad/v1/api/schedule/:appkey http://domain.com/cad/v1/api/schedule/:appkey |
| HEADER | Content-Type: application/json apikey: |
| DESCRIPTION | Inserts a new schedule with the required fields. |
| VERSION | 1.0 |

Request Parameter

TABLE 13

| Add Application Release Schedule API Request Parms | | |
|---|---|---|
| Parameter | Type | Description |
| app key | String | Name of the app for which schedule is retrieved. |

Sample Request
```
{
  "releaseName": "Programmable Network Platform X",
  "releaseVersion": 1.0,
  "releaseStartdate": "2000-10-09T00:00:00.000Z",
  "releaseEnddate": "2000-11-30T00:00:00.000Z",
  "releaseComments": "This is a test comment",
  "releaseStatus": "G"
}
```
Sample Response
```
{
  "response": {
  "success": true
  }
}
```

Update Application Release Schedule API

TABLE 14

| Update Application Release Schedule API | |
|---|---|
| METHOD | PUT |
| API URL | cad/v1/api/schedule/:appkey http://domain.com/cad/v1/api/schedule/:appkey |
| HEADER | Content-Type: application/json apikey: |
| DESCRIPTION | Updates an existing schedule through appkey lookup. If app exists, the app is updated else a new document is inserted. |
| VERSION | 1.0 |

Request Parameter

TABLE 15

| Update Application Release Schedule API Request Parms | | |
|---|---|---|
| Parameter | Type | Description |
| app key | String | Name of the app for which schedule is updated. |

Sample Request
```
{
  "appname": "ECX",
  "releaseDetails": {
    "upcomingReleaseDetails": [
      {
        "releaseName": "ECX 1.1",
        "releaseVersion": 1.1,
        "releaseStartdate": "2000-10-09T00:00:00.000Z",
        "releaseEnddate": "2000-11-30T00:00:00.000Z",
        "releaseComments": "This is a test comment",
        "releaseStatus": "G"
      },
      {
        "releaseName": "ECX 1.2",
        "releaseVersion": 1.2,
        "releaseStartdate": "2000-10-09T00:00:00.000Z",
        "releaseEnddate": "2000-11-30T00:00:00.000Z",
        "releaseComments": "This is a test comment",
        "releaseStatus": "G"
      },
    ],
    "currentProductionRelease": {
      "releaseName": "ECX 1.0",
      "releaseVersion": 1.0,
      "releaseStartdate": "2015-10-09T00:00:00.000Z",
      "releaseEnddate": "2015-11-30T00:00:00.000Z",
      "releaseComments": "This is a test comment",
      "releaseStatus": "G"
    }
  }
}
```
Editable fields: All fields are editable except appname.
Get User Profile API

TABLE 16

| Get User Profile API | |
|---|---|
| METHOD | GET |
| API | cad/v1/api/user/:username |
| URL | http://domain.com/cad/v1/api/user/:username |
| HEADER | Content-Type: application/json apikey: |
| DESCRIPTION | Retrieves an existing user profile. |
| VERSION | 1.0 |

Request Parameter

TABLE 17

| Get User Profile API Request Parms | | |
|---|---|---|
| Parameter | Type | Description |
| username | String | Username of the user for which profile is retrieved |

Sample Response
```
{
  "_id": "565cf97cd00ebc080db95e02",
  "UserName": "userID",
  "Email": "user@domain.com",
  "Cell": " ",
  "FirstName": " ",
  "LastName": " ",
  "Address": " ",
  "City": " ",
  "State": " ",
  "Region": " ",
  "Groups": [
    {
      "self":"http://domain.com/rest/api/2/group?groupname=ACL-RUNDECK-ADMIN",
      "name": "ACL-RUNDECK-ADMIN"
    },
    {
      "self":"http://domain.com/rest/api/2/group?groupname=ACL-RUNDECK-ECX-INT-JOB-EXEC",
      "name": "ACL-RUNDECK-ECX-INT-JOB-EXEC"
    },
    {
      "self":"http://domain.com/rest/api/2/group?groupname=jenkins-administrators",
      "name": "jenkins-administrators"
    },
    {
      "self": "http://domain.com/rest/api/2/group?groupname=jira-administrators",
      "name": "jira-administrators"
    },
    {
      "self": "http://domain.com/rest/api/2/group?groupname=jira-users",
      "name": "jira-users"
    }
  ],
  "UserPreferences": {
    "Apps": {
      "Preferences": {
        "Alert": [ ],
        "Favorite": [ ],
        "NotificationView": [ ]
      },
      "AppLayout": [
        "GRID"
      ],
      "AppView": [
        "MKP",
        "ECX",
        "AppX",
      ]
    }
  },
  "Team": [ ]
}
```

Update User Profile API

TABLE 18

| \multicolumn{2}{c}{Update User Profile API} ||
| --- | --- |
| METHOD | PUT |
| API | cad/v1/api/user/:username |
| URL | http://domain.com/cad/v1/api/user/:username |
| HEADER | Content-Type: application/json<br>apikey: |
| DESCRIPTION | Updates an existing user profile |
| VERSION | 1.0 |

Request Parameter

TABLE 19

| \multicolumn{3}{c}{Update User Profile API Request Parms} |||
| --- | --- | --- |
| Parameter | Type | Description |
| app key | String | Username of the user for whom the profile needs to be updated. The username parameter is the Login username |

Sample Request
```
{
  "UserName": "userID",
  "Email": "user@domain.com",
  "Cell": " ",
  "FirstName": " ",
  "LastName": " ",
  "Address": " ",
  "City": " ",
  "State": " ",
  "Region": " ",
  "Groups": [
    {
      "self":"http://domain.com/rest/api/2/group?groupname=ACL-RUNDECK-ADMIN",
      "name": "ACL-RUNDECK-ADMIN"
    },
    {
      "self":"http://domain.com/rest/api/2/group?groupname=ACL-RUNDECK-MKP-INT-JOB-EXEC",
      "name": "ACL-RUNDECK-MKP-INT-JOB-EXEC"
    },
    {
      "self":"http://domain.com/rest/api/2/group?groupname=jenkins-administrators",
      "name": "jenkins-administrators"
    },
    {
      "self":            "http://domain.com/rest/api/2/group?groupname=jira-administrators",
      "name": "jira-administrators"
    },
    {
      "self":            "http://domain.com/rest/api/2/group?groupname=jira-users",
      "name": "jira-users"
    }
  ],
  "UserPreferences": {
    "Apps": {
      "Preferences": {
        "Alert": [ ],
        "Favorite": [ ],
        "NotificationView": [ ]
      },
      "AppLayout": [
        "GRID"
      ],
      "AppView": [
        "MKP",
        "ECX",
        "AppX"
      ]
    }
  },
  "Team": [ ]
}
```
Sample Response
```
{
  "UserUpdateResponse":}
  "success": true
  }
}
```

All user profile fields are editable other than UserName and Groups. In the UserPreferences field: App-View represent an array displaying apps against the "ALL APPS" header on the home screen; AppLayout represents array specifying either GRID or LIST view as set by the user; Alert represents an array of apps for which alerts has been set; Favorite represents an array of apps which has been set as favorite and is displayed against the "FAVORITE APPS" header on the home screen. The UserPreferences determine the display by the user application 510 to a display associated with user device 134 for the identified user.

Build API

TABLE 20

| \multicolumn{2}{c}{Build API} ||
| --- | --- |
| METHOD | GET |
| API | cad/v1/jenkinsjobs/[PROJECT_NAME] |
| URL | http://domain.com/cad/v1/jenkinsjobs/[PROJECT_NAME] |
| HEADER | Content-Type: application/json<br>apikey: |
| DESCRIPTION | This api gets the list of build results for a particular job |
| VERSION | 1.0 |

Request Parameter

TABLE 21

| \multicolumn{3}{c}{Build API Request Parms} |||
| --- | --- | --- |
| Parameter | Type | Description |
| PROJECT_NAME | String | Name of the project for which the build results are required. |

Sample Response
```
{
  Successful:"20"
  "failed":"10"
}
```

Code Metrics API

TABLE 22

| \multicolumn{2}{c}{Code Metrics API} |  |
| --- | --- |
| METHOD | GET |
| API | cad/v1/api/resources |
| URL | http://domain.com/api/resources?metrics=ncloc,coverage,violations |
| HEADER | Content-Type: application/json apikey: |
| DESCRIPTION | This api gets code metrics for an application code base. |
| VERSION | 1.0 |

Request Parameters

TABLE 23

| \multicolumn{3}{c}{Code Metrics Parms} | | |
| --- | --- | --- |
| Parameter | Key | Description |
| Lines of Code | ncloc | Number of physical lines that contain at least one character which is neither a whitespace or a tabulation or part of a comment. |
| Coverage | coverage | A mix of Line coverage and Condition coverage. Its goal is to provide an even more accurate answer to the following question: How much of the source code has been covered by the unit tests? |
| Issues | violations | Number of issues |
| X Issues | X_violations | Number of issues with severity X, X being blocker, critical, major, minor or info. |

Sample Response
```
{
   "key": "coverage",
   "val": "20"
}
```

List All Projects API

TABLE 24

| \multicolumn{2}{c}{List All Projects API} |  |
| --- | --- |
| METHOD | GET |
| API | cad/v1/apps |
| URL | http://domain.com/cad/v1/apps |
| HEADER | Content-Type: application/json apikey: |
| DESCRIPTION | Gets the list of applications |
| VERSION | 1.0 |

Request Parameters

TABLE 25

| \multicolumn{3}{c}{List All Projects Parms} | | |
| --- | --- | --- |
| Parameter | Type | Description |
| q | string | search query terms<br>Views: Displays all apps based on the view the user has configured. (Either list or grid view)<br>Usage: http://domain.com/cad/v1/apps?q=list<br>Filters: Display all apps based on the filters applied in the settings page. |

TABLE 25-continued

| \multicolumn{3}{c}{List All Projects Parms} | | |
| --- | --- | --- |
| Parameter | Type | Description |
|  |  | Lines of Code |
|  |  | Code Quality |
|  |  | Jira Issues ( Blocker, Critical ) |
| favapp | string | A flag to indicate if the app is set as a favorite or not.<br>Values: true or false<br>Default: false<br>Usage:<br>http://domain.com/cad/v1/apps?favapp=true |

Sample Response
```
{
  "appsresult": {
    "apps": [
      {
        "app_id": "748734",
        "app_name": "ECX",
        "lead_name": "XYZ",
        "blocker_issues": "4",
        "critical_issues": "3",
        "lines_of_code": "10000",
        "test_coverage": "0.0",
        "health_index": "87",
        "color_code": "green",
        "notification_count": "25",
        "production_version": "2.0",
        "fav": "true",
        "builds": [
          {
            "successful": "14",
            "failed": "2",
            "build_number": "4"
          }
        ]
      },
      {
        "app_id": "747761",
        "app_name": "MKP",
        "lead_name": "ABC",
        "blocker_issues": "5",
        "critical_issues": "7",
        "lines_of_code": "12311",
        "test_coverage": "5.0",
        "health_index": "91",
        "color_code": "green",
        "notification_count": "10",
        "production_version": "1.5",
        "fav": "true",
        "builds": [
          {
            "successful": "18",
            "failed": "5",
            "build_number": "12"
          }
        ]
      },
      {
        "app_id": "748111",
        "app_name": "AppX",
        "lead_name": "DEF",
        "blocker_issues": "2",
        "critical_issues": "3",
        "lines_of_code": "40000",
        "test_coverage": "3.0",
        "health_index": "70",
        "color_code": "orange",
        "notification_count": "5",
```

```
"production_version": "2.1",
"fav": "true",
"builds": [
    {
        "successful": "8",
        "failed": "1",
        "build_number": "9"
    }
]
        }
    ]
}
}
```

List Project by ID API

TABLE 26

List All Projects API

| | |
|---|---|
| METHOD | GET |
| API | cad/v1/[APP_NAME]/appindex |
| URL | http://domain.com/cad/v1/[APP_NAME]/appindex |
| HEADER | Content-Type: application/json apikey: |
| DESCRIPTION | Gets health index and other indications of CAD progress for an application |
| VERSION | 1.0 |

Sample Response

```
[
  {
    "app_id":"748734",
    "app_name": "ECX",
    "lead_name": "XYZ",
    "blocker_issues": "4",
    "critical_issues": "3",
    "lines_of_code": "10000",
    "test_coverage": "0.0",
    "health_index": "87",
    "color_code": "green",
    "notification_count": "25",
    "production_version": "2.0",
    "fav":"true",
    "builds": [
        {
          "successful": "20",
          "failed":"10",
          "build_number":"3",
        }
    ]
  }
]
```

List Project by ID API

TABLE 27

Get Notifications by Application API

| | |
|---|---|
| METHOD | GET |
| API | cad/v1/[APP_NAME]/notifications |
| URL | http://domain.com/cad/v1/[APP_NAME]/notifications |
| HEADER | Content-Type: application/json apikey: |
| DESCRIPTION | Gets notifications by app name |
| VERSION | 1.0 |

Request Parameter

TABLE 28

Get Notifications by Application API Parms

| Parameter | Type | Description |
|---|---|---|
| APP_NAME | String | Name of the application for which notifications have to be retrieved. |

Sample Response

```
{
  "apps": [
    {
      "name": "ECX",
      "notification":
      [
        {
        }
      ],
      "count":"25"
    }
  ]
}
```

Get All Notifications API

TABLE 29

Get All Notifications API

| | |
|---|---|
| METHOD | GET |
| API | cad/v1/notifications |
| URL | http://domain.com/cad/v1/notifications |
| HEADER | Content-Type: application/json apikey: |
| DESCRIPTION | Gets notifications for all Applications |
| VERSION | 1.0 |

Sample Response

```
{
  "total_count":"40"
  "apps": [
    {
      "name": "ECX"
      "notification":
        [ { } ]
    },
    {
      "name": "AppX",
      "notification":
        [{ }]
    },
    {
      "name": "MKP",
      "notification":
        [{ }]
    }
  ]
}
```

Set Filters API

TABLE 30

Set Filters API

| | |
|---|---|
| METHOD | POST |
| API | cad/v1/filters |
| URL | http://domain.com/cad/v1/filters |

TABLE 30-continued

Set Filters API

| | |
|---|---|
| METHOD | POST |
| HEADER | Content-Type: application/json<br>apikey: |
| DESCRIPTION | Sets the filter specified by the filter name |
| VERSION | 1.0 |

Sample Request:
{
  "filters": [
  {
  "value1":"CODE_QUALITY",
  "value2":"BLOCKER_ISSUES"
  }
  ]
}
Sample Response:
{
  "Result":"Success"
}
Toggle Views API

TABLE 31

Toggle Views API

| | |
|---|---|
| METHOD | POST |
| API | cad/v1/views |
| URL | http://domain.com/cad/v1/views |
| HEADER | Content-Type: application/json<br>apikey: |
| DESCRIPTION | Sets the view on the home screen specified by the view name |
| VERSION | 1.0 |

Sample Request:
{"view": "LIST"}
Sample Response:
{
  "Result":"Success"
}
Favorite Apps API

TABLE 32

Favorite Apps API

| | |
|---|---|
| METHOD | POST |
| API | cad/v1/favapps |
| URL | http://domain.com/cad/v1/favapps |
| HEADER | Content-Type: application/json<br>apikey: |
| DESCRIPTION | Sets the app specified by app id as a favorite app |
| VERSION | 1.0 |

Sample Request:
{
  "app_name": "ECX",
  "app_id":"6765757"
  "setfav":"true"
}

Sample Response:
{
  "Result":"Success"
}

The above example endpoints for composite API 506 enable a user of user application 510 to determine the presentation of CAD progress by user application 510. The List Project by ID API endpoint, when invoked by a request from user application 510, causes orchestrator 550 to execute, in parallel or serially, multiple CAD sub-system tasks 502, 516 to invoke endpoints presents by CAD sub-systems 542, 546 to receive multiple indications of CAD progress for an application. Analytics engine 504 may determine the health index 536 for the application, and orchestrator 550 returns a consolidated response that includes the plurality of indications of CAD progress and, in some instances, the health index 536. Example indications of CAD progress may include blocker issues, critical issues, lines of code, health index, a notification count, a production version, a number of successful builds, a number of failed builds, a build number, and others. A blocker issue is a code issue that blocks development and/or testing work, for example. A critical issue is a code issue that causes crashes, loss of data, and/or a severe memory leak, for example.

Orchestrator 550 may include extensible CAD task 516 for adding a task for dynamically extending orchestrator 550 to obtain a new indication of CAD progress from an extensible CAD sub-system 546 without having to rebuild the orchestrator 550. Configuring extensible CAD task 516 is described in further detail below with respect to FIGS. 6-7.

Figure 14A:
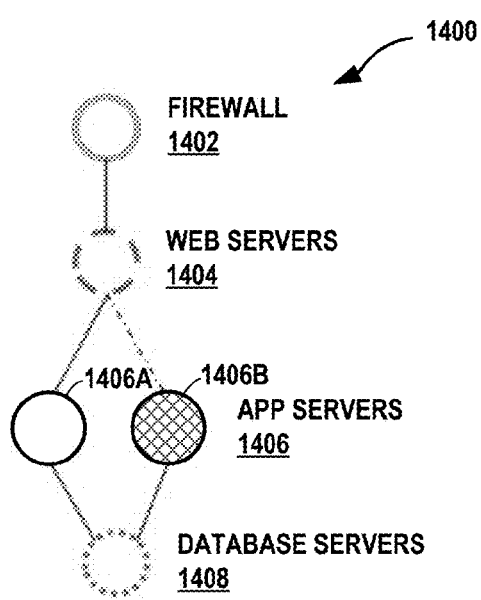
FIGS. 14A-14B are conceptual diagrams depicting example visualizations of a deployment, dynamically generated according to techniques described herein.
Figure 14B:
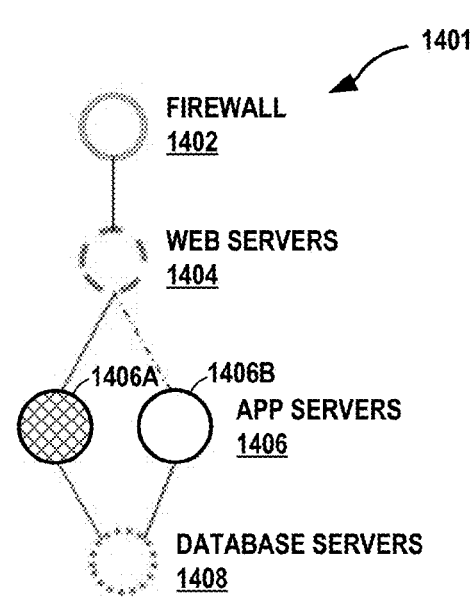

In some examples, application delivery monitor 532 includes a deployment discovery and visualization module 534 accessible to user application 510 via composite API 506. A discover component of deployment discovery and visualization module 534 crawls, by invoking tasks 502, the CAD sub-systems 540 to collect deployment data describing the infrastructure, system, and deployed applications using an agent or agent-less model. Having obtained the deployment data, a mapping component of the deployment discovery and visualization module 534 may then correlate and map the logical information describing the infrastructure, system, and deployed applications. A plotter component of the deployment discovery and visualization module 534 may then dynamically plot/graph the mapped information and present an architectural diagram leveraging data aggregated from the discovery and mapping components. Deployment discovery and visualization module 534 may use information obtained from orchestrator 550, such as the health indices for various applications, to visualize the deployment status of the system representing an overview of the hardware/server identifications, process names, health status of the various components, and so forth. Example visualizations are shown in FIGS. 14A-14B.

Figure 6:
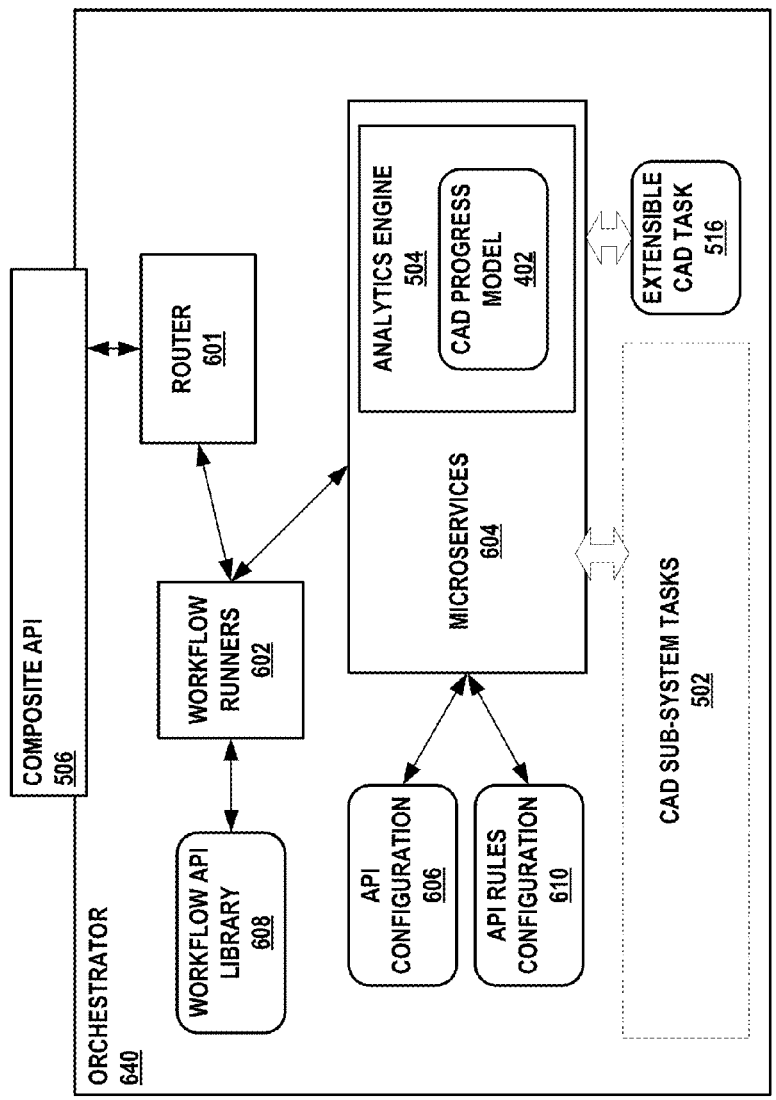
FIG. 6 is a block diagram illustrating an example instance of an orchestrator for implementing a composite API for obtaining indications of CAD progress, according to techniques described in this disclosure.

FIG. 6 is a block diagram illustrating an example instance of an orchestrator for implementing a composite API for obtaining indications of CAD progress, according to techniques described in this disclosure. Orchestrator 640 of FIG. 6 may represent an example instance of orchestrator 540 of FIG. 5.

Orchestrator 640 operates as part of an overall application delivery monitor platform. Orchestrator 640 orchestrates a plurality of microservices 604, which each implements a set of focused and distinct features or functions, and a microservice conforms to (or is usable in) an architectural pattern in which many dozens or even hundreds of microservices can be independently developed and deployed. Microservice 604 may be organized for the capability of interfacing with different CAD sub-systems 542, 546 and may each implement a "broad-stack" of software for the capability, including persistent storage and any external collaboration. The various microservices 604 expose interfaces that enable the microservices 604 to invoke one another to exchange data and perform the respective sets of functions in order to create an overall application. In some examples, microservices 604 may represent or include other microservice examples described in this disclosure, e.g., microservices.

Each of microservices 604 may adhere to a well-defined Application Programming Interface (API) and may be orchestrated, by invoking the API of the microservice 604, according to a workflow performed by one of workflow runners 602. The orchestrator 640 component "orchestrates" the microservices 604 based on rules or workflows defined in workflow API library for various API endpoints exposed by the composite API 506 (e.g., via an API server/gateway such as API gateway 508) and invokable by API requests that conform to the respective API contracts. The orchestrator 640 may handle API requests generically by following an established set of rules, or workflows, that allow a fully-customizable API contract for each external channel to API consumers, such as different users of user application 510, where such users may represent members of the CAD team, the integration team, or the executive team, for instance. The workflow may be implemented, in some examples, as a state machine. Because of variability in the request/response contract for each channel corresponding to a different group or team, the orchestrator 640 described in this disclosure may enable and provide equal support for the differences across different channels.

API configuration 606 stores configuration data that defines contracts for APIs exposed by CAD sub-systems. API configuration 606 may be modified by a developer at run-time to include additional configuration for an additional API to a new sub-system, such as API endpoints for the new sub-system. For example, API configuration 606 may be modified to add an API endpoint usable by extensible CAD task 516 to issue requests to extensible CAD sub-system 546. API rules configuration 610 stores configuration data that defines rules for using API configurations stored to API configuration 606, and for generating API responses for the API configurations.

Orchestrator 640 organizes, directs and integrates microservice-based tasks 502, 516 to interact with underlying CAD sub-systems for managing various aspects of application delivery monitoring. As described herein, orchestration 640 synthesizes the information and actions from underlying CAD sub-systems of an application delivery to generate a consolidated response with multiple indications of CAD progress for applications responsive to dynamic requests made by the user application 510. As such, orchestrator 640 enables the application delivery monitor to abstract the complexity of the underlying CAD sub-systems for the application delivery platform by providing a uniform, simplified, and secured means to receive indications of CAD progress.

Request router 601 receives API requests for composite API 506 endpoints and routes the API requests according to path, request parameters, filters, user identity, and other parameters. A route may resolve to one of workflow API library 608 workflows, which a workflow runner of workflow runners 602 executes to orchestrate and perform the functionality associated with the API endpoint invoked by an API request routed by the request router 601.

Microservices 604 may in some instances execute analytics engine 504, which applies a CAD progress model 402 to a plurality of indications of CAD progress received for an application to generate an application health index. CAD progress model 402 may include coefficients representing a relative importance of different indication values. CAD progress model 402 may, in some examples, weight more recent builds (whether successful or unsuccessful) more highly than less recent unsuccessful builds. CAD progress model 402 may calculate metrics based on the number of lines of code, the change in the number of lines of code; the code test coverage; a number of blocker issues; a number of critical issues; a version; hardware usage in the form of main memory, CPU, or storage utilization, a number of machines used to execute the application, a number of automated jobs executed, and so forth, all of which provide an indication of a CAD progress for an application. Analytics engine 504 applies the CAD progress model 402 to generate a composite indication that provides, at a glance, a health of the application. The health index may be determined and presented as a scalar, a percentage, a color, a glyph, or other composite indication of CAD progress for an application.

Figure 7:
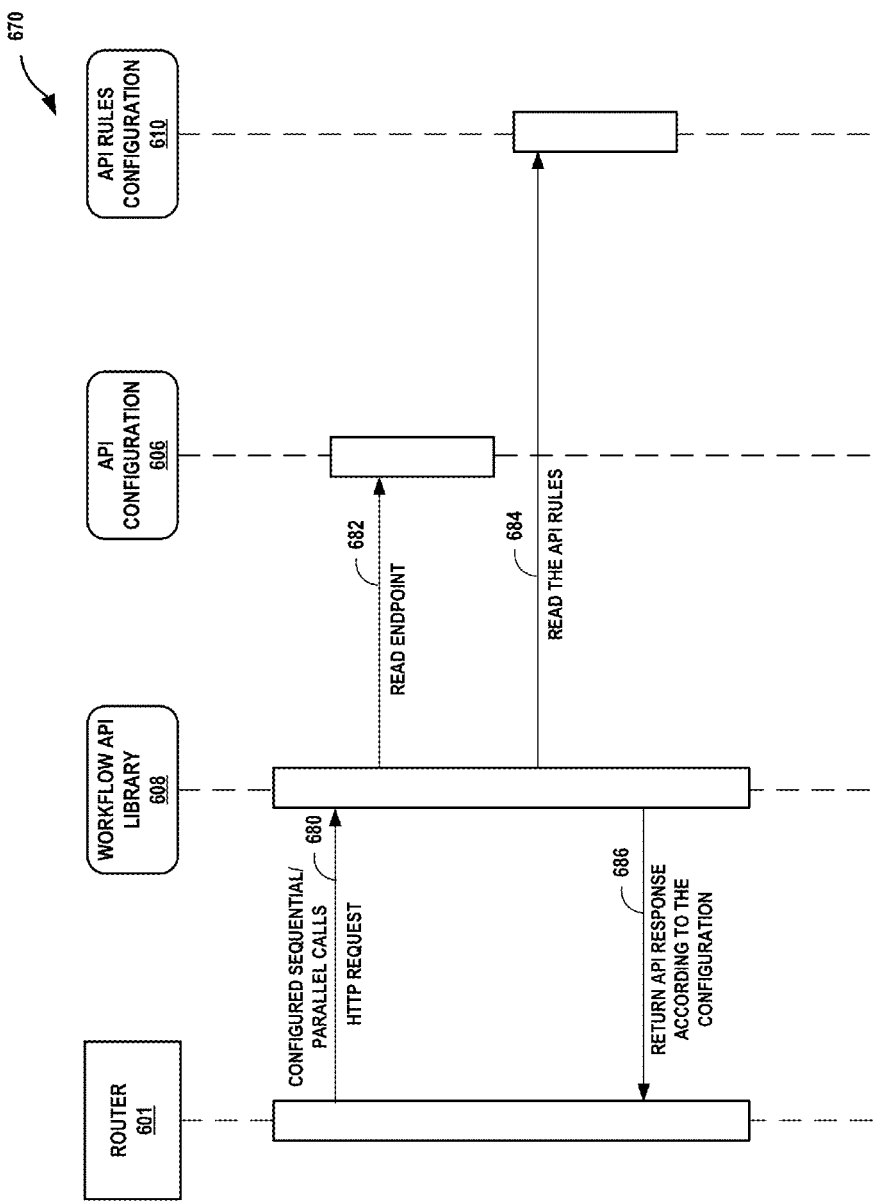
FIG. 7 is a conceptual diagram illustrating a mode of operation for using a dynamic configured application programming interface for a continuous application delivery sub-system.

FIG. 7 is a conceptual diagram illustrating a mode of operation for using a dynamic configured application programming interface for a continuous application delivery sub-system. Router 601 receives via composite API 506 a request and generates multiple sub-requests for the request to obtain respective indications of CAD progress from different CAD sub-systems (680). A workflow runner orchestrating one or more microservices 604 receives the HTTP request and executes a corresponding workflow from workflow API library 608 to, among other tasks, read a configured API endpoint in API configuration 606 (682) and to read API rules configuration for the configured API endpoint from API rules configuration 610 (684). The one or more microservices 604 invoke the configured API endpoint according to the API rules configuration and return an API response (686). In this way, orchestrator 640 enables a dynamic configuration and generation of API endpoints (e.g., using JSON) for multi-API orchestration and extensible API configuration. The orchestrator 640 as a microservices-based application also enables serialized and/or parallelized execution of API calls to CAD sub-systems, as well as configurable, rule-based workflows.

FIGS. 8-11 are block diagrams illustrating example user devices configured to display various screens of user application 510 for presenting, to a display device for user device 134, indications of CAD progress for applications and for configuring the presentation, in accordance with techniques described in this disclosure. In some examples, the display device may be physically separate from user device 134. The display device for user device 134 may represent a touch- or presence-sensitive screen, a monitor, a projector, or other type of display device for displaying a screen, for example.

Figure 8:
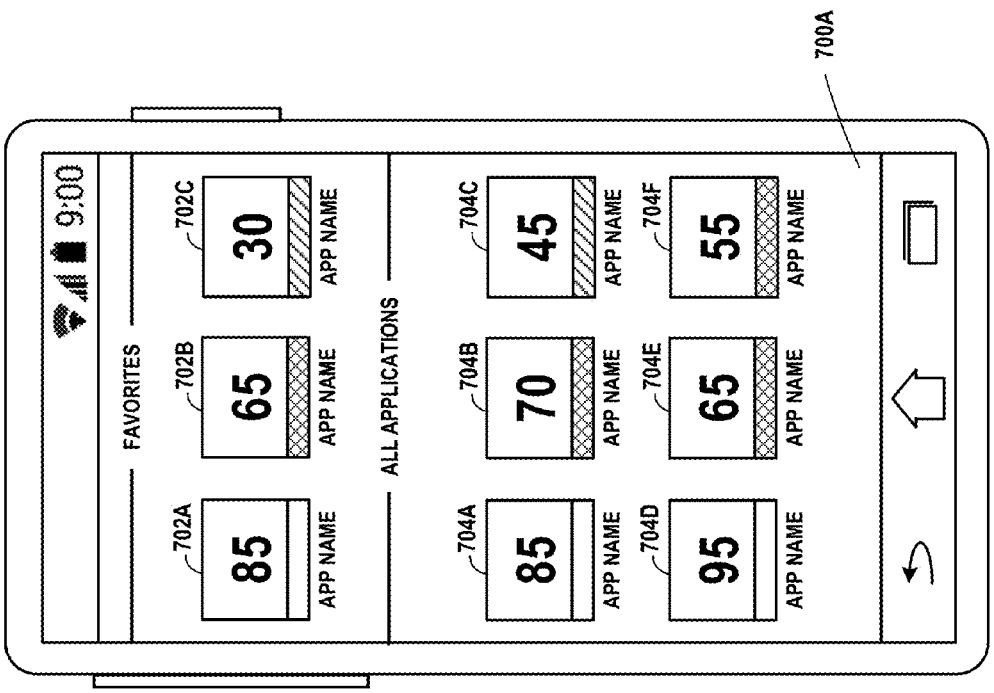

FIG. 8 depicts a screen 700A output by a display device for user device 134. Screen 700A depicts a grid view for application delivery monitoring and includes indications 702A-702C for respective favorite applications of the user as well as indications 704A-704F for respective all applications accessible to the user. Each of indications 702, 704, identifies the application name ("APP NAME") and includes a health index and a color or pattern that represents a range for the health index, the range representing different gradations of health (e.g., green, yellow, red in descending order of health). In this example, the health index is within a range of 0-100, inclusive. For example, the indication 702A includes a health index of "85," which is relatively healthy, and thus the pattern indicates a healthy range for the health index. As another example, indication 702B includes a health index of "65," which is relatively unhealthy, and thus the pattern indicates an unhealthy range for the health index. The ranges representing different gradations of health for CAD may in some instance be user-configurable. The ranges representing different gradations of health for CAD may in some instance be application-specific such that different applications have different heath gradation thresholds.

Screen 700A may be generated by user application 134 and output by user device 134 after validation of the user credentials. Favorite applications may be configurable by the user. In some instances, screen 700A may depict a total number of notifications for all of the applications.

Figure 9:
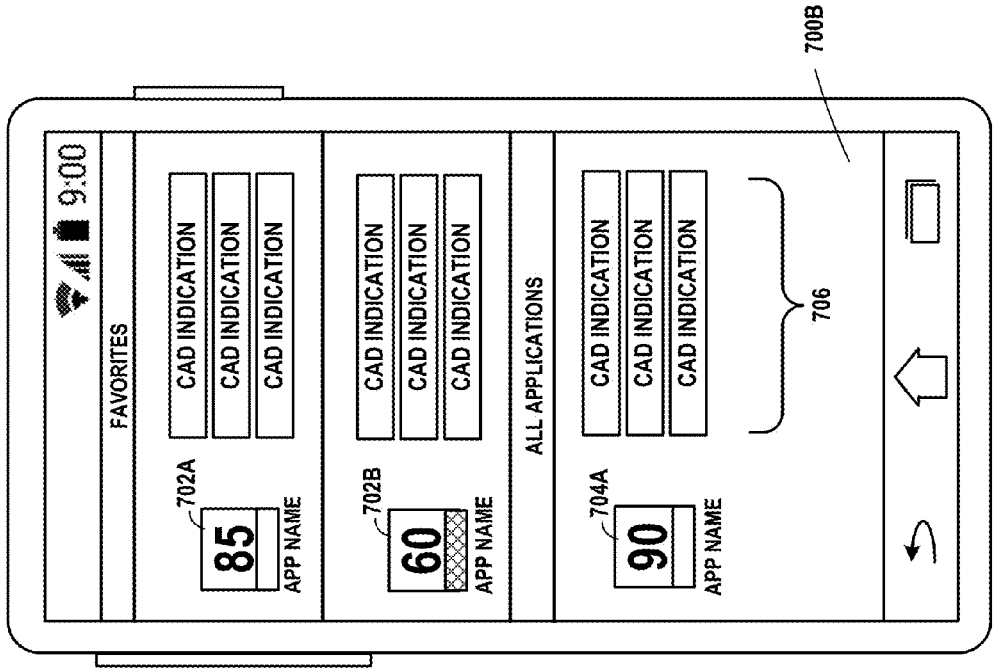

FIG. 9 depicts a screen 700B output by a display device for user device 134. Screen 700B depicts a list view for application delivery monitoring and includes indications 702, 704 including the health indices, as well as individuated CAD indications 706 from different CAD sub-systems. For example, any of CAD indications 706 may depict a number of successful (failed) deployments, a number of lines of code, an expected delivery or build date, a number of failed builds, the date of the most recent failed build, or any other indication of CAD progress described herein. In some instances, screen 700B may depict special badges based on health index, a number of total notifications for each application listed, and infrastructure details such as CPU/RAM utilization and hard disk usage.

FIG. 10 depicts a screen 700C output by a display device for user device 134 for configuring filters corresponding to different indications of CAD progress receivable from CAD sub-systems. In this example, the filters are configurable by checking a checkbox to indicate the user would prefer to receive the corresponding indication. For example, filter 750 is checked to indicate the user would prefer to receiving an indication of test coverage from the code application 542D CAD sub-system, via code task 502D. A toggle or other control for indicating a user preference with respect to a filter may be used in some examples. Other filters depicted in FIG. 10 include code quality filter 752, blocker filter 754 for receiving a number of blocker issues, critical filter 756 for receiving a number of critical issues, and deployment job 758 for receiving deployment-related indications from, e.g., the build application 542B CAD sub-system, via build task 502B. In some instances, analytics engine 504 may configure the CAD progress model 402 to only account for metrics for which the user is interested, based on those filters that have been selected via screen 700C and sent from user application 510 to the application delivery monitor via composite API 506.

FIG. 11 depicts a screen 700D output by a display device for user device 134 for illustrating, for a single application, a detailed presentation of multiple indications of CAD progress received from multiple different CAD sub-systems. Screen 700D includes indications of CAD progress 780, 782, 784, 786, 788, 790, as described elsewhere in this disclosure. Screen 700D also includes notifications area 792 for displaying notifications for the application. Screen 700D also includes badges 776, 778, which may provide, at a glance, indications of characteristics of the application, such as the application having a lean codebase, a high health index, a strong test coverage of the code bases, or other indications. Badges 776, 788 may be any glyph, such as a ribbon colored to indicate a particular characteristic of the application.

Figure 12:
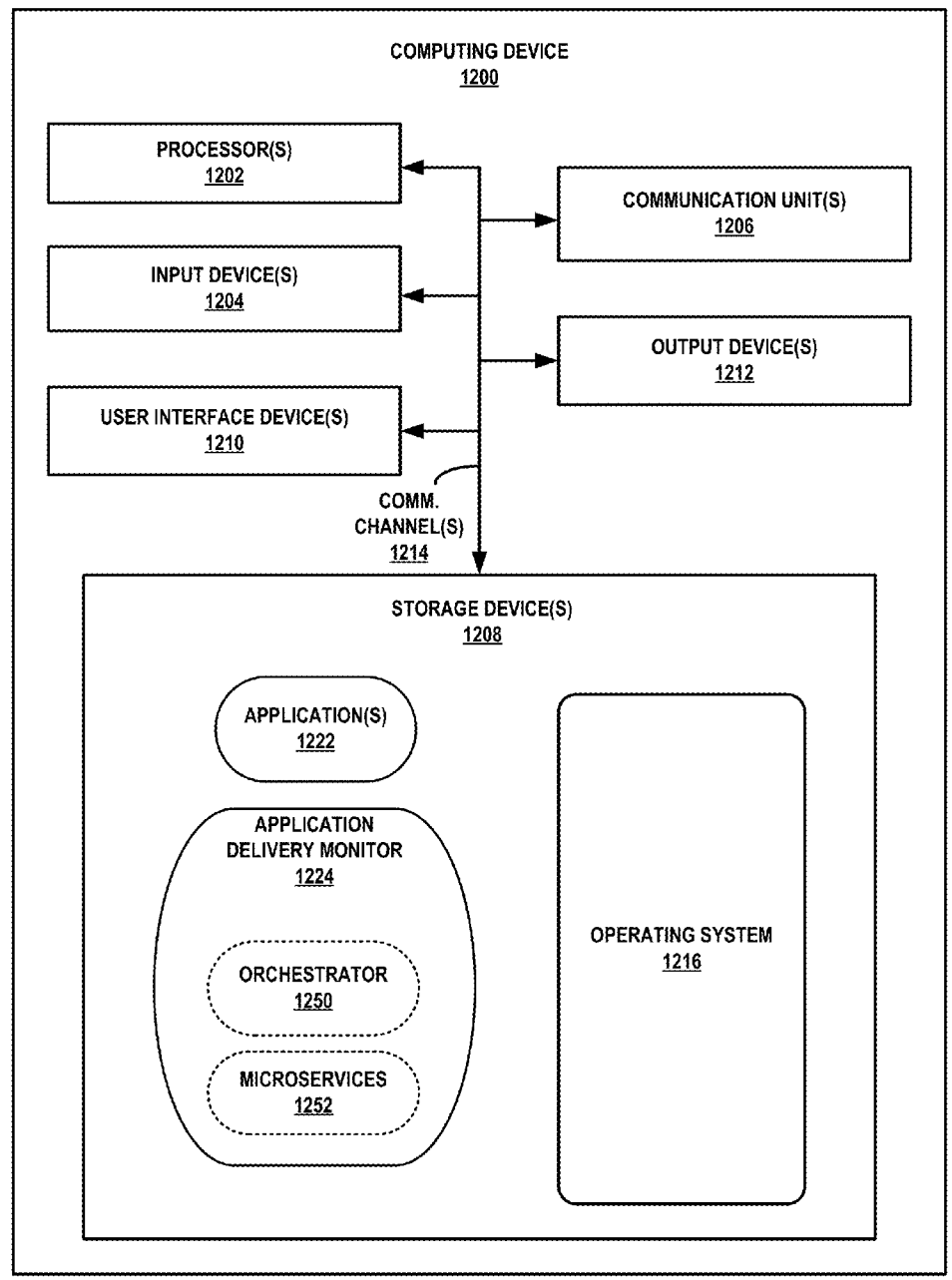
FIG. 12 is a block diagram illustrating further details of one example of a computing device that operates in accordance with one or more techniques of the present disclosure.

FIG. 12 is a block diagram illustrating further details of one example of a computing device that operates in accordance with one or more techniques of the present disclosure. FIG. 12 may illustrate a particular example of a server or other computing device 1200 that includes one or more processor(s) 1202 for executing, e.g., application delivery monitor 132, 532. Other examples of computing device 1200 may be used in other instances. Although shown in FIG. 12 as a stand-alone computing device 1200 for purposes of example, a computing device may be any component or system that includes one or more processors or other suitable computing environment for executing software instructions and, for example, need not necessarily include one or more elements shown in FIG. 12 (e.g., communication units 1206; and in some examples components such as storage device(s) 1208 may not be co-located or in the same chassis as other components). Computing device 1200 may be located and execute, for example, within a private, public, or hybrid cloud, in a data center.

As shown in the specific example of FIG. 12, computing device 1200 includes one or more processors 1202, one or more input devices 1204, one or more communication units 1206, one or more output devices 1212, one or more storage devices 1208, and user interface (UI) device 1210, and communication unit 1206. Computing device 1200, in one example, further includes one or more applications 1222, application delivery monitor application 1224, and operating system 1216 that are executable by computing device 1200. Each of components 1202, 1204, 1206, 1208, 1210, and 1212 are coupled (physically, communicatively, and/or operatively) for inter-component communications. In some examples, communication channels 1214 may include a system bus, a network connection, an inter-process communication data structure, or any other method for communicating data. As one example, components 1202, 1204, 1206, 1208, 1210, and 1212 may be coupled by one or more communication channels 1214.

Processors 1202, in one example, are configured to implement functionality and/or process instructions for execution within computing device 1200. For example, processors 1202 may be capable of processing instructions stored in storage device 1208. Examples of processors 1202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1208 may be configured to store information within computing device 1200 during operation. Storage device 1208, in some examples, is described as a computer-readable storage medium. In some examples, storage device 1208 is a temporary memory, meaning that a primary purpose of storage device 1208 is not long-term storage. Storage device 1208, in some examples, is described as a volatile memory, meaning that storage device 1208 does not maintain stored contents when the computer is turned off. Examples of volatile memories include random access memories (RAM), dynamic random access memories (DRAM), static random access memories (SRAM), and other forms of volatile memories known in the art. In some examples, storage device 1208 is used to store program instructions for execution by processors 1202. Storage device 1208, in one example, is used by software or applications running on computing device 1200 to temporarily store information during program execution.

Storage devices 1208, in some examples, also include one or more computer-readable storage media. Storage devices 1208 may be configured to store larger amounts of information than volatile memory. Storage devices 1208 may further be configured for long-term storage of information. In some examples, storage devices 1208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1200, in some examples, also includes one or more communication units 1206. Computing device 1200, in one example, utilizes communication units 1206 to communicate with external devices via one or more networks, such as one or more wired/wireless/mobile networks. Communication units 1206 may include a network interface card, such as an Ethernet card, an optical transceiver, a radio frequency transceiver, or any other type of device that can send and receive information. Other examples of such network interfaces may include 3G and WiFi radios. In some examples, computing device 1200 uses communication unit 1206 to communicate with an external device.

Computing device 1200, in one example, also includes one or more user interface devices 1210. User interface devices 1210, in some examples, are configured to receive input from a user through tactile, audio, or video feedback. Examples of user interface devices(s) 1210 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1212 may also be included in computing device 1200. Output device 1212, in some examples, is configured to provide output to a user using tactile, audio, or video stimuli. Output device 1212, in one example, includes a presence-sensitive display, a sound card, a video graphics adapter card, or any other type of device for converting a signal into an appropriate form understandable to humans or machines. Additional examples of output device 1212 include a speaker, a cathode ray tube (CRT) monitor, a liquid crystal display (LCD), or any other type of device that can generate intelligible output to a user.

Computing device 1200 may include operating system 1216. Operating system 1216, in some examples, controls the operation of components of computing device 1200. For example, operating system 1216, in one example, facilitates the communication of one or more applications 1222 and application delivery monitor application 1224 with processors 1202, communication unit 1206, storage device 1208, input device 1204, user interface devices 1210, and output device 1212.

Application 1222 and application delivery monitor application 1224 may also include program instructions and/or data that are executable by computing device 1200. Example application delivery monitor application 1224 executable by computing device 1200 may include any one or more of orchestrator module 1250 and microservices 1252, each illustrated with dashed lines to indicate that these may or may not be executable by any given example of computing device 1200.

Orchestrator module 1250 may include instructions for causing computing device to perform one or more of the operations and actions described in the present disclosure with respect to orchestrator 550, 640. As one example, orchestrator module 1250 may include instructions that cause computing device 1200 to orchestrate microservices 1252 executed by computing device 1200 or at different computing devices to perform application delivery monitoring and present consolidated indications of CAD progress for applications, as described herein.

Microservices 1252 may include instructions for causing computing device to perform one or more of the operations and actions described in the present disclosure with respect to microservices 604. As one example, one or more microservices 1252 may perform any of tasks 502 to obtain indications of CAD progress from CAD sub-systems for an application delivery platform.

Figure 13:
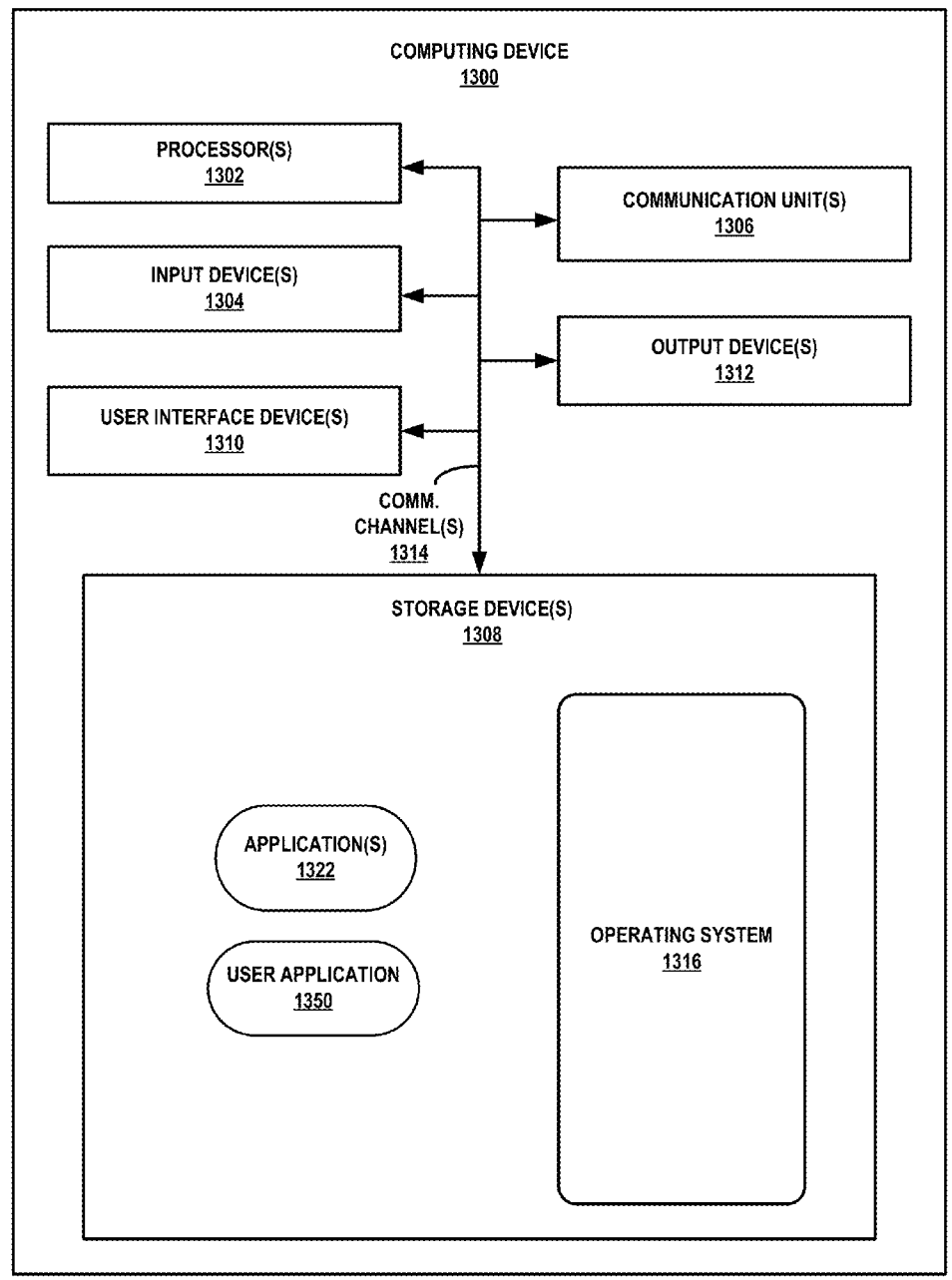
FIG. 13 is a block diagram illustrating further details of one example of a computing device that operates in accordance with one or more techniques of the present disclosure.

FIG. 13 is a block diagram illustrating further details of one example of a computing device that operates in accordance with one or more techniques of the present disclosure. FIG. 13 may illustrate a particular example of an end-user device, such as a smartphone, tablet, workstation, or laptop computer, or other computing device 1300 that includes one or more processor(s) 1302 for executing, e.g., user application 1350. Other examples of computing device 1300 may be used in other instances. Although shown in FIG. 13 as a stand-alone computing device 1300 for purposes of example, a computing device may be any component or system that includes one or more processors or other suitable computing environment for executing software instructions and, for example, need not necessarily include one or more elements shown in FIG. 13 (e.g., communication units 1306; and in some examples components such as storage device(s) 1308 may not be co-located or in the same chassis as other components).

As shown in the specific example of FIG. 13, computing device 1300 includes one or more processors 1302, one or more input devices 1304, one or more communication units 1306, one or more output devices 1312, one or more storage devices 1308, and user interface (UI) device 1310, and communication unit 1306. Computing device 1300, in one example, further includes one or more applications 1322, application delivery monitor application 1324, and operating system 1316 that are executable by computing device 1300. Each of components 1302, 1304, 1306, 1308, 1310, and 1312 are coupled (physically, communicatively, and/or operatively) for inter-component communications. In some examples, communication channels 1314 may include a system bus, a network connection, an inter-process communication data structure, or any other method for communicating data. As one example, components 1302, 1304, 1306, 1308, 1310, and 1312 may be coupled by one or more communication channels 1314.

Processors 1302, in one example, are configured to implement functionality and/or process instructions for execution within computing device 1300. For example, processors 1302 may be capable of processing instructions stored in storage device 1308. Examples of processors 1302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1308 may be configured to store information within computing device 1300 during operation. Storage device 1308, in some examples, is described as a computer-readable storage medium. In some examples, storage device 1308 is a temporary memory, meaning that a primary purpose of storage device 1308 is not long-term storage. Storage device 1308, in some examples, is described as a volatile memory, meaning that storage device 1308 does not maintain stored contents when the computer is turned off. Examples of volatile memories include random access memories (RAM), dynamic random access memories (DRAM), static random access memories (SRAM), and other forms of volatile memories known in the art. In some examples, storage device 1308 is used to store program instructions for execution by processors 1302. Storage device 1308, in one example, is used by software or applications running on computing device 1300 to temporarily store information during program execution.

Storage devices 1308, in some examples, also include one or more computer-readable storage media. Storage devices 1308 may be configured to store larger amounts of information than volatile memory. Storage devices 1308 may further be configured for long-term storage of information. In some examples, storage devices 1308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1300, in some examples, also includes one or more communication units 1306. Computing device 1300, in one example, utilizes communication units 1306 to communicate with external devices via one or more networks, such as one or more wired/wireless/mobile networks. Communication units 1306 may include a network interface card, such as an Ethernet card, an optical transceiver, a radio frequency transceiver, or any other type of device that can send and receive information. Other examples of such network interfaces may include 3G and WiFi radios. In some examples, computing device 1300 uses communication unit 1306 to communicate with an external device.

Computing device 1300, in one example, also includes one or more user interface devices 1310. User interface devices 1310, in some examples, are configured to receive input from a user through tactile, audio, or video feedback. Examples of user interface devices(s) 1310 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1312 may also be included in computing device 1300. Output device 1312, in some examples, is configured to provide output to a user using tactile, audio, or video stimuli. Output device 1312, in one example, includes a presence-sensitive display, a sound card, a video graphics adapter card, or any other type of device for converting a signal into an appropriate form understandable to humans or machines. Additional examples of output device 1312 include a speaker, a cathode ray tube (CRT) monitor, a liquid crystal display (LCD), or any other type of device that can generate intelligible output to a user.

Computing device 1300 may include operating system 1316. Operating system 1316, in some examples, controls the operation of components of computing device 1300. For example, operating system 1316, in one example, facilitates the communication of one or more applications 1322 and user application 1350 with processors 1302, communication unit 1306, storage device 1308, input device 1304, user interface devices 1310, and output device 1312.

Application 1322 and user application 1350 may also include program instructions and/or data that are executable by computing device 1300. User application 1350 may represent a web browser or a standalone application. User application 1350 may include instructions for causing computing device to perform one or more of the operations and actions described in the present disclosure with respect to user device 134 and user application 510. For example, user application 1350 may display any of screens 700 of FIGS. 8-11 depicting indications of CAD progress for one or more applications.

FIGS. 14A-14B are conceptual diagrams depicting example visualizations of a deployment, dynamically generated according to techniques described herein. Deployment visualizations 1400, 1401 may be generated by deployment discovery and visualization module 534, for instance. In this example, deployment visualization 1400 illustrates two application servers 1406A, 1406B. Deployment visualization 1400 indicates application server 1406B is unhealthy (hashed fill). At a subsequent time, deployment visualization 1401 is updated from deployment visualization to indicate that application server 1406A is now unhealthy (hashed fill), while application 1406B is now healthy (no fill).

Figure 15:
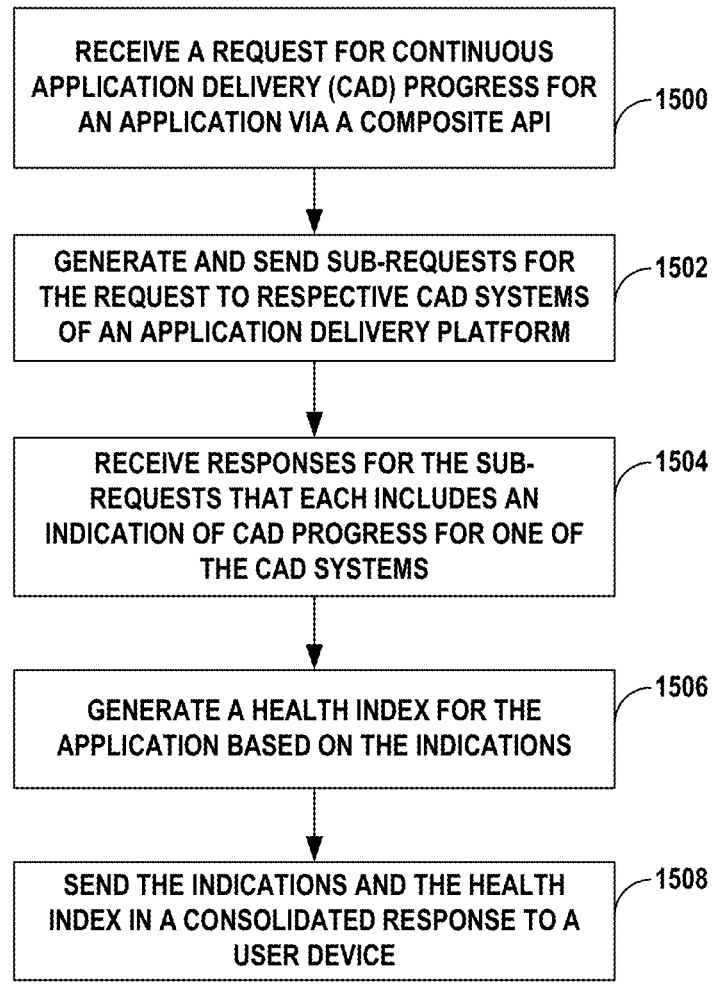
FIG. 15 is a flowchart illustrating an example mode of operation for a continuous application delivery monitor, according to techniques described in this disclosure.

FIG. 15 is a flowchart illustrating an example mode of operation for a continuous application delivery monitor, according to techniques described in this disclosure. Application delivery monitor 532 receives, via composite API 506, a request for continuous application delivery (CAD) progress for an application (1500). In response, application delivery monitor 532 generates and sends a plurality of sub-requests to respective CAD sub-systems of an application delivery platform usable for building, testing, and/or deploying the application (1502). The application delivery monitor 532 receives responses from each of the CAD sub-systems, the responses including indications of CAD progress for the application from the corresponding CAD sub-system (1504). The application delivery monitor 532 then generates a health index 536 based on the indications (1506), and sends at least one of the indications and the health index to a user device for display to a user (1508).

Figure 16:
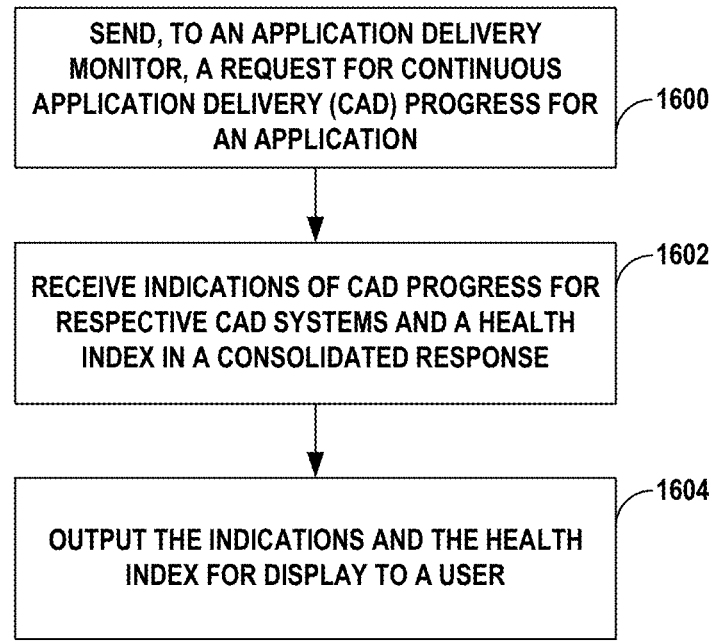
FIG. 16 is a flowchart illustrating an example mode of operation for a user device to obtain indications of continuous application delivery progress for an application, according to techniques described in this disclosure.

FIG. 16 is a flowchart illustrating an example mode of operation for a user device to obtain indications of continuous application delivery progress for an application, according to techniques described in this disclosure. User device 134 sends a request for continuous application delivery (CAD) progress for an application to an application delivery monitor (1600). User device 134 receives, in response, a health index for the application and a plurality of indications for CAD progress for the application, each indication generated by a different CAD sub-system for the application (1602). User device 134 displays the health index and the plurality of indications to a user (1604).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    receiving, by a computing device, application programming interface configuration data defining an endpoint for a continuous application delivery sub-system from a plurality of continuous application delivery sub-systems of an application delivery platform;
    receiving, by the computing device, application programming interface rules configuration data defining rules for invoking the endpoint for the continuous application delivery sub-system;
    receiving, by the computing device from a user device, a request for continuous application delivery progress for an application;
    generating, by the computing device in response to the request and according to the application programming interface rules configuration data, a sub-request for the request;
    sending, by the computing device in response to the request, respective sub-requests for the request to the plurality of continuous application delivery sub-systems, wherein sending the respective sub-requests comprises sending the sub-request to the endpoint for the continuous application delivery sub-system;
    receiving, by the computing device in response to the sub-requests, respective indications of continuous application delivery progress from the plurality of continuous application delivery sub-systems; and
    sending, by the computing device to the user device, a consolidated response to the request, wherein the consolidated response includes the respective indications of continuous application delivery progress from the plurality of continuous application delivery sub-systems.

2. The method of claim 1, further comprising:
    generating, by the computing device based on the indications of continuous application delivery progress, a health index indicating an overall continuous application delivery progress of the application.

3. The method of claim 2, wherein generating the health index comprises applying a continuous application delivery progress model to the indications of continuous application delivery progress received from the plurality of continuous application delivery sub-systems.

4. The method of claim 2, further comprising:
    receiving, by the computing device from the end user device, one or more filters selected by a user, the filters indicating selected indications from the indications of continuous application delivery progress,
    wherein generating the health index comprises generating, based only on the selected indications of continuous application delivery progress, the health index indicating the overall continuous application delivery progress of the application.

5. The method of claim 1, wherein at least one of the plurality of continuous application delivery sub-systems comprises one of a task automation application, a code application, an infrastructure application, and a container application.

6. The method of claim 1, wherein the plurality of continuous application delivery sub-systems comprise at least one of a build application for automated build, staging, and deployment of the application.

7. The method of claim 1, wherein each of the plurality of continuous application delivery sub-systems is not executed by the computing device.

8. The method of claim 1,
    wherein the plurality of continuous application delivery sub-systems execute respective application programming interfaces, and
    wherein the respective sub-requests invoke the respective application programming interfaces executed by the plurality of continuous application delivery sub-systems.

9. The method of claim 1, wherein the indications of continuous application delivery progress comprise at least one of a number of successful deployments for the application, a number of failed deployments for the application, a size of a code base for the application, a number of containers being used to execute the application, a number of blocker code issues, a number of critical code issues, and a resource utilization by the application.

10. The method of claim 1, wherein the application comprises a programmable network platform for a cloud exchange operable within a data center.

11. The method of claim 1,
    wherein receiving the request for continuous application delivery progress for the application comprises receiving the request with a request router of the computing device, and
    wherein the router generates the plurality of sub-requests based at least on the request, the method further comprising:
    executing, by the computing device, an orchestrator to orchestrate a plurality of microservices, according to one or more configurable workflows, to concurrently send the respective sub-requests and receive the respective indications of continuous application delivery progress.

12. The method of claim 11,
    wherein the plurality of continuous application delivery sub-systems execute respective application programming interfaces, and
    wherein the plurality of microservices send the respective sub-requests to invoke the respective application programming interfaces executed by the plurality of continuous application delivery sub-systems.

13. The method of claim 1, wherein receiving the request for continuous application delivery progress comprising receiving, by the computing device via a composite application programming interface executed by the computing device, the request for continuous application delivery progress.

14. An application delivery monitor system comprising:
one or more programmable processors operably coupled to at least one memory;
an application programming interface gateway configured for execution by the one or more programmable processors to execute an application programming interface to receive, from a user device, a request for continuous application delivery progress for an application; and
an orchestrator configured for execution by one or more programmable processors to receive application programming interface configuration data defining an endpoint for a continuous application delivery sub-system from a plurality of continuous application delivery sub-systems of an application delivery platform,
wherein the orchestrator is further configured to receive application programming interface rules configuration data defining rules for invoking the endpoint for the continuous application delivery sub-system,
wherein the orchestrator is further configured to generate, in response to the request and according to the application programming interface rules configuration data, a sub-request for the request,
wherein the orchestrator is further configured to send, in response to the request, respective sub-requests for the request to the plurality of continuous application delivery sub-systems, wherein to send the respective sub-requests the orchestrator is configured to send the sub-request to the endpoint for the continuous application delivery sub-system,
wherein the orchestrator is further configured to receive, in response to the sub-requests, respective indications of continuous application delivery progress from the plurality of continuous application delivery sub-systems, and
wherein the orchestrator is further configured to send, to the user device, a consolidated response to the request, wherein the consolidated response includes the respective indications of continuous application delivery progress from the plurality of continuous application delivery sub-systems.

15. The application delivery monitor system of claim 14, further comprising:
an analytics engine configured for execution by the one or more programmable processors to generate, based on the indications of continuous application delivery progress, a health index indicating an overall continuous application delivery progress of the application.

16. The application delivery monitor system of claim 15, wherein the analytics engine is configured to generate the health index by applying a continuous application delivery progress model to the indications of continuous application delivery progress received from the plurality of continuous application delivery sub-systems.

17. The application delivery monitor system of claim 15, wherein the orchestrator is further configured to receive, from the end user device, one or more filters selected by a user, the filters indicating selected indications from the indications of continuous application delivery progress, and
wherein the analytics engine is configured to generate, based only on the selected indications of continuous application delivery progress, the health index indicating the overall continuous application delivery progress of the application.

18. The application delivery monitor system of claim 14, further comprising:
a plurality of microservices configured for execution by the one or more programmable processors,
wherein the orchestrator comprises a request router to receive the request for continuous application delivery progress for the application,
wherein the request router is configured to generate the plurality of sub-requests based at least on the request, and
wherein the orchestrator is configured to orchestrate a plurality of microservices, according to one or more configurable workflows, to concurrently send the respective sub-requests and receive the respective indications of continuous application delivery progress.

19. The application delivery monitor system of claim 18, wherein the plurality of continuous application delivery sub-systems execute respective application programming interfaces, and
wherein the plurality of microservices are configured to send the respective sub-requests to invoke the respective application programming interfaces executed by the plurality of continuous application delivery sub-systems.

20. A system comprising:
an application delivery monitor system comprising:
one or more programmable processors operably coupled to at least one memory;
an application programming interface gateway configured for execution by the one or more programmable processors to execute an application programming interface to receive, from a computing device, a request for continuous application delivery progress for an application; and
an orchestrator configured for execution by one or more programmable processors to receive application programming interface configuration data defining an endpoint for a continuous application delivery sub-system from a plurality of continuous application delivery sub-systems of an application delivery platform,
wherein the orchestrator is further configured to receive application programming interface rules configuration data defining rules for invoking the endpoint for the continuous application delivery sub-system,
wherein the orchestrator is further configured to generate, in response to the request and according to the application programming interface rules configuration data, a sub-request for the request,
wherein the orchestrator is further configured to send, in response to the request, respective sub-requests for the request to the plurality of continuous application delivery sub-systems, wherein to send the respective sub-requests the orchestrator is configured to send the sub-request to the endpoint for the continuous application delivery sub-system,
wherein the orchestrator is further configured to receive, in response to the sub-requests, respective indications of continuous application delivery progress from the plurality of continuous application delivery sub-systems, and
wherein the orchestrator is further configured to send, to the computing device, a consolidated response to the request, wherein the consolidated response includes the respective indications of continuous application delivery progress from the plurality of continuous application delivery sub-systems; and a computing device comprising:
one or more programmable processors operably coupled to at least one memory; and
a user application configured for execution by the one or more programmable processors of the computing device to receive, from the application delivery monitor system, the consolidated response,
wherein the user application is further configured to output, to a display device, the respective indications of continuous application delivery progress from the plurality of continuous application delivery sub-systems.

21. The system of claim 20, wherein the user application is further configured to send a request for continuous application delivery progress for the application, wherein the consolidated response is received in response to the request.

22. The system of claim 20,
wherein the user application is further configured to receive a health index indicating an overall continuous application delivery progress of the application, and
wherein the user application is further configured to output, to the display device, the health index.

\* \* \* \* \*